(12) United States Patent
Bono et al.

(10) Patent No.: US 9,092,290 B1
(45) Date of Patent: Jul. 28, 2015

(54) PERFORMING A NON-DISRUPTIVE SOFTWARE UPGRADE ON PHYSICAL STORAGE PROCESSORS HAVING ACCESS TO VIRTUAL STORAGE PROCESSORS

(71) Applicant: EMC Corporation, Hopkinton, MA (US)

(72) Inventors: Jean-Pierre Bono, Westborough, MA (US); Frederic Corniquet, Le Pecq (FR); Miles A. de Forest, Bahama, NC (US); Himabindu Tummala, South Grafton, MA (US); Walter C. Forrester, Berkeley Heights, NJ (US)

(73) Assignee: EMC Corporation, Hopkinton, MA (US)

( * ) Notice: Subject to any disclaimer, the term of this patent is extended or adjusted under 35 U.S.C. 154(b) by 174 days.

(21) Appl. No.: 13/838,498

(22) Filed: Mar. 15, 2013

(51) Int. Cl.
*G06F 9/44* (2006.01)
*G06F 9/45* (2006.01)
*G06F 9/445* (2006.01)

(52) U.S. Cl.
CPC ... *G06F 8/61* (2013.01); *G06F 8/65* (2013.01)

(58) Field of Classification Search
None
See application file for complete search history.

(56) References Cited

U.S. PATENT DOCUMENTS

| | | | |
|---|---|---|---|
| 6,681,390 B2 * | 1/2004 | Fiske | 717/173 |
| 7,383,463 B2 | 6/2008 | Hayden et al. | |
| 7,631,155 B1 | 12/2009 | Bono et al. | |
| 7,769,722 B1 | 8/2010 | Bergant et al. | |
| 8,285,758 B1 | 10/2012 | Bono et al. | |
| 8,706,833 B1 | 4/2014 | Bergant et al. | |
| 2002/0073410 A1 * | 6/2002 | Lundback et al. | 717/171 |
| 2014/0096121 A1 * | 4/2014 | Joshi et al. | 717/170 |

OTHER PUBLICATIONS

Kallahalla et al., "SoftUDC: A Software-Based Data Center for Utility Computing", Published in IEEE Computer, vol. 37, Issue 11, pp. 38-46, Nov. 2004.*

* cited by examiner

*Primary Examiner* — Wei Zhen
*Assistant Examiner* — Timothy Duncan
(74) *Attorney, Agent, or Firm* — BainwoodHuang

(57) ABSTRACT

A non-disruptive upgrade technique involves, with (i) a first SP using first virtual SPs (VSPs) defining first environments for first host file systems, (ii) a second SP using second VSPs defining second environments for second host file systems, and (iii) an initial software version installed on each SP, processing host I/Os on the host file systems by the SPs. The technique further involves moving the first VSPs from the first SP to the second SP to provision the second SP to process host I/Os concurrently on the first and second host file systems using the first and second VSPs. The technique further involves, after moving the first VSPs from the first SP to the second SP and while the second SP processes host I/Os concurrently on the first and second host file systems using the first and second VSPs, installing a new backwards compatible software version on the first SP.

22 Claims, 11 Drawing Sheets

FIG. 4
| VSP ID 1 410 | Owner | |
|---|---|---|
| | Authentication | |
| | Root FS | UDFS ID |
| | Config FS | UDFS ID |
| | Host FS A | UDFS ID |
| | Host FS B | UDFS ID |
| | ... | ... |
| | Host Interfaces | |
400
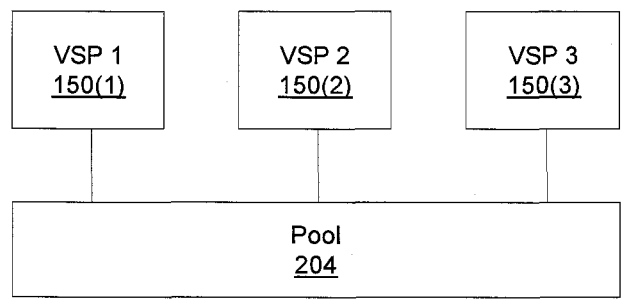
FIG. 5A
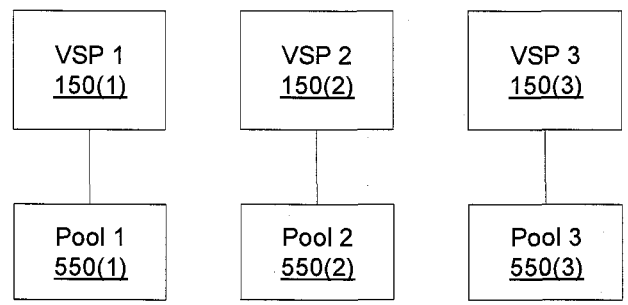
FIG. 5B

PERFORMING A NON-DISRUPTIVE SOFTWARE UPGRADE ON PHYSICAL STORAGE PROCESSORS HAVING ACCESS TO VIRTUAL STORAGE PROCESSORS

BACKGROUND

Data storage systems typically include one or more physical storage processors (SPs) accessing an array of disk drives and/or electronic flash drives. Each SP is connected to a network, such as the Internet and/or a storage area network (SAN), and receives transmissions over the network from host computing devices ("hosts"). The transmissions from the hosts include "IO requests," also called "host IOs." Some IO requests direct the SP to read data from an array, whereas other IO requests direct the SP to write data to the array. Also, some IO requests perform block-based data requests, where data are specified by LUN (Logical Unit Number) and offset values, whereas others perform file-based requests, where data are specified using file names and paths. Block-based IO requests typically conform to a block-based protocol, such as Fibre Channel or iSCSI (Internet SCSI, where SCSI is an acronym for Small Computer System Interface), for example. File-based IO requests typically conform to a file-based protocol, such as NFS (Network File System), CIFS (Common Internet File System), or SMB (Server Message Block), for example.

In some data storage systems, an SP may operate one or more virtual data movers. As is known, a virtual data mover is a logical grouping of file systems and servers that is managed by the SP and provides a separate context for managing host data stored on the array. A single SP may provide multiple virtual data movers for different users or groups. For example, a first virtual data mover may organize data for users in a first department of a company, whereas a second virtual data mover may organize data for users in a second department of the company. Each virtual data mover may include any number of host file systems for storing user data.

SUMMARY

In a typical virtual data mover arrangement, the SP has a root file system with mount points to which the host file systems of each virtual data mover are mounted. Thus, the SP and all its virtual data movers form a single, large directory and all share a common namespace. Hosts can access their virtual data mover-managed data by connecting to the SP over the network, logging on, and specifying paths relative to the SP's root where their data are kept. The typical arrangement thus requires hosts to access data of a virtual data mover using paths that are referenced to and dependent upon the root of the SP.

In addition, settings for prescribing virtual data mover operations are conventionally stored in the root file system of the SP. Many of these settings are global to all virtual data movers operating on the SP; others may be specific to particular virtual data movers.

Unfortunately, the intermingling of virtual data mover content within an SP's root file system impairs the ease of mobility and management of virtual data movers. For example, administrators wishing to move a virtual data mover (e.g., its file systems, settings, and servers) from one SP to another SP must typically perform many steps on a variety different data objects. File systems, server configurations, and other settings may need to be moved one at a time. Also, as the contents of different virtual data movers are often co-located, care must be taken to ensure that changes affecting one virtual data mover do not disrupt the operation of other virtual data movers. Moreover, to perform a non-disruptive software upgrade on the data storage system, it may make sense to move a conventional virtual data mover from one physical SP to another, but the above-described complexity of conventional virtual data movers makes it prohibitively difficult to move a conventional virtual data mover among physical SPs.

In contrast to the above-described conventional virtual data movers which are not moved among physical SPs due to their complexity, improved techniques are directed to performing a non-disruptive upgrade (NDU) of software on a data storage apparatus having multiple physical SPs which access virtual storage processors (VSPs). The VSPs are capable of being moved from one physical SP to another during NDU. Accordingly, a new version of software can be installed on each physical SP while that physical SP is free of VSPs, i.e., with the VSPs residing on one or more remaining physical SPs of the data storage apparatus. Additionally, the new version of the software is capable of being backwards compatible so that once all of the physical SPs have the new version installed, a coordinated switchover can take place which commits the data storage apparatus to operating in accordance with a new mode that is different from the backwards compatible mode.

One embodiment is directed to a method of performing a non-disruptive upgrade of software installed on physical storage processors of a data storage apparatus. The method includes, with (i) a first physical storage processor initially using a first set of virtual storage processors (VSPs) to define a first set of operating environments for a first set of host file systems, (ii) a second physical storage processor initially using a second set of VSPs to define a second set of operating environments for a second set of host file systems, and (iii) an initial version of the software being installed on each of the first and second physical storage processors, processing host input/output (I/O) requests on the host file systems by the physical storage processors. The method further includes moving the first set of VSPs from the first physical storage processor to the second physical storage processor to provision the second physical storage processor to process host I/O requests concurrently on the first and second sets of host file systems using the first and second sets of VSPs. The method further includes, after the first set of VSPs is moved from the first physical storage processor to the second physical storage processor and while the second physical storage processor processes host I/O requests concurrently on the first and second sets of host file systems using the first and second sets of VSPs, installing a new version of the software on the first physical storage processor, the new version of the software being backwards compatible with the initial version of the software.

In some arrangements, the method further includes, after the new version of the software is installed on the first physical storage processor, moving the first and second sets of VSPs from the second physical storage processor to the first physical storage processor to provision the first physical storage processor to process host I/O requests concurrently on the first and second sets of host file systems using the first and second sets of VSPs. In these arrangements, the method further includes, after the first and second sets of VSPs are moved from the second physical storage processor to the first physical storage processor and while the first physical storage processor processes host I/O requests concurrently on the first and second sets of host file systems using the first and second sets of VSPs, installing the new version of the software on the second physical storage processor.

In some arrangements, the method further includes, moving the second set of VSPs from the first physical storage processor back to the second physical storage processor to re-provision the second physical storage processor to process host I/O requests on the second set of host file systems using the second set of VSPs. The method further includes, after the second set of VSPs is moved from the first physical storage processor back to the second physical storage processor, processing host I/O requests on the host file systems by the physical storage processors while the new version of the software is installed on the physical storage processors.

In some arrangements, processing host I/O requests on the host file systems by the physical storage processors while the new version of the software is installed on the physical storage processors includes processing host I/O requests on the host file systems by the physical storage processors while each of the first and second physical storage processors operates using the new version of the software in a backward compatible mode. Accordingly, the host I/O requests are processed in the same manner as that of the initial version of the software.

In some arrangements, the method further includes receiving a commit command and, in response to the commit command, switching each of the first and second physical storage processors from operating using the new version of the software in the backward compatible mode to operating using the new version of the software in a new version mode which is different than the backward compatible mode. Such a command may be provided by a user through a user interface for user control over commitment.

In some arrangements, operating the first and second physical storage processors using the new version of the software in the backward compatible mode includes processing host I/O requests in accordance with a first file-based protocol. In these arrangements, operating the first and second physical storage processors using the new version of the software in the new version mode may include processing host I/O requests in accordance with a second file-based protocol that is different than the first file-based protocol.

In some arrangements, the method further includes receiving a completion command and, in response to the completion command, deeming the non-disruptive upgrade of the software to be complete while continuing to operate each of the first and second physical storage processors using the new version of the software in the backward compatible mode rather than switch to using the new version of the software in a new version mode which is different than the backward compatible mode. Such arrangements, allow NDU to be viewed as completed even though commitment may be deferred for an extended period of time.

In some arrangements, wherein each VSP includes a root file system and a VSP configuration file system contained within a set of lower-deck file of a lower-deck file system of the data storage apparatus, the VSP configuration file system storing VSP data which identifies host file system operating environment characteristics. In these arrangements, using the first set of VSPs to define the first set of operating environments includes accessing the VSP configuration file system of each VSP of the first set. Additionally, using the second set of VSPs to define the second set of operating environments includes accessing the VSP configuration file system of each VSP of the second set.

In some arrangements, the data storage apparatus includes at least two physical storage processors. In these arrangements, the method may further include, prior to processing the host I/O requests on the host file systems by the physical storage processors, updating a configuration database to identify, for each VSP, one of the physical storage processors as a primary owner of that VSP. Each VSP resides on its primary owner upon completion of the non-disruptive upgrade.

In some arrangements, the method further includes trespassing block-based processing among the physical storage processors in tandem with moving VSPs among the physical storage processors to remove processing of all host I/O requests from each physical storage processor when the new version of the software is installed on that physical storage processor. Accordingly, NDU can be performed on a data storage apparatus having physical SPs which process both file-based and block-based host I/O requests.

It should be understood that, in the cloud context, processing circuitry is formed by remote computer resources distributed over a network. Such a computing environment is capable of providing certain advantages such as enhanced fault tolerance, load balancing, processing flexibility, etc.

Other embodiments are directed to electronic systems and apparatus, processing circuits, computer program products, and so on. Some embodiments are directed to various methods, electronic components and circuitry which are involved in performing a non-disruptive upgrade of software installed on physical storage processors of a data storage apparatus.

BRIEF DESCRIPTION OF THE DRAWINGS

The foregoing and other features and advantages will be apparent from the following description of particular embodiments of the invention, as illustrated in the accompanying drawings, in which like reference characters refer to the same parts throughout the different views. In the accompanying drawings.

FIG. 4 is a table showing an example set of records stored in a configuration database that defines a VSP that can be run on the storage processor of FIG. 1;

FIGS. 5A and 5B are block diagrams showing example arrangements of virtualized storage processors.

DETAILED DESCRIPTION

Overview

Figure 1:
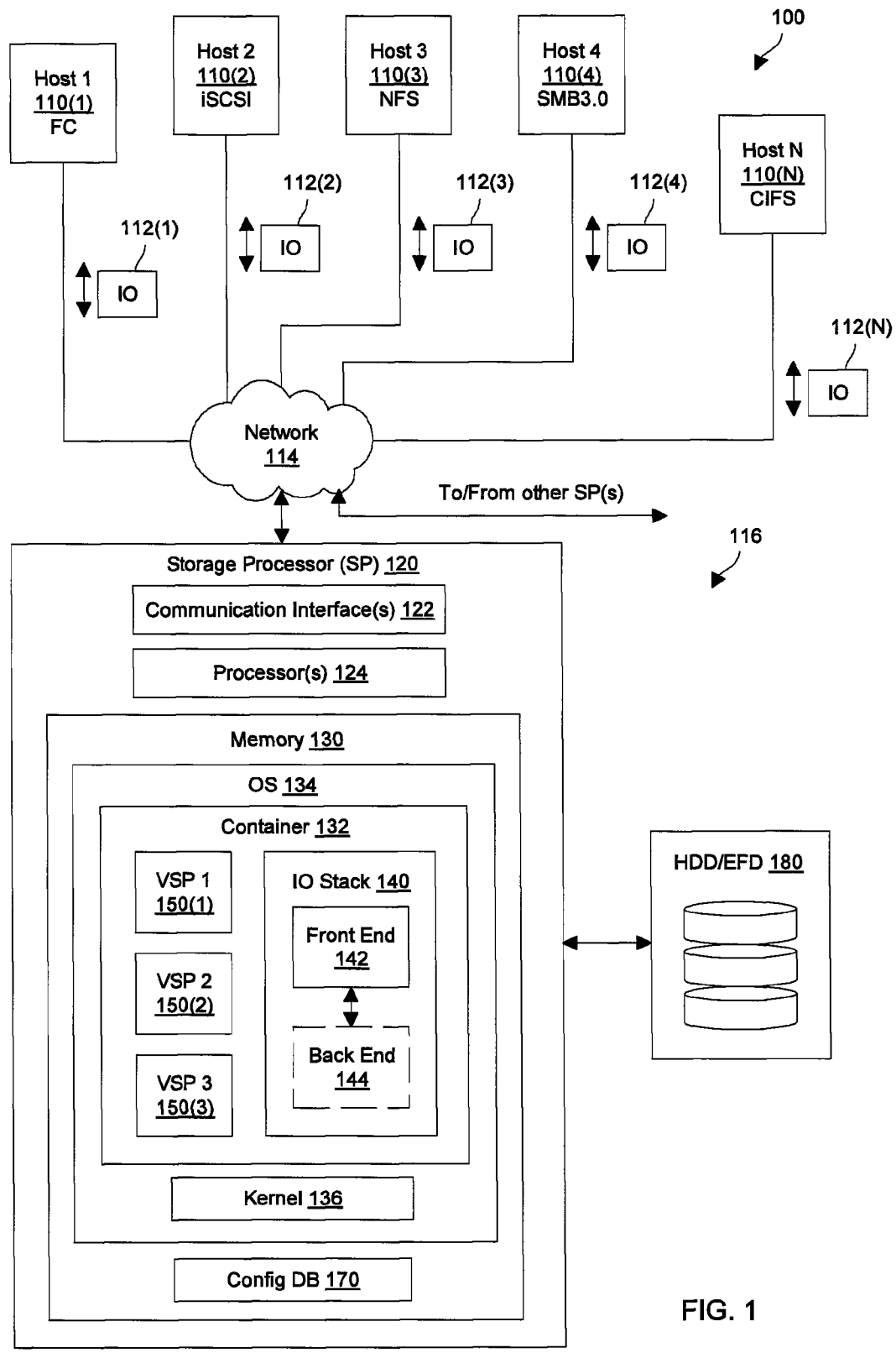
FIG. 1 is a block diagram showing an example data storage apparatus in an environment wherein improved techniques hereof may be practiced, the data storage apparatus including a storage processor having multiple virtualized storage processors (VSPs)

Embodiments of the invention will now be described. It is understood that such embodiments are provided by way of example to illustrate various features and principles of the invention, and that the invention hereof is broader than the specific example embodiments disclosed.

An improved technique is directed to performing a non-disruptive upgrade (NDU) of software on a data storage apparatus having multiple physical storage processors (SPs) which access virtual storage processors (VSPs). The VSPs are capable of being moved from one physical SP to another during NDU. Accordingly, a new version of the software can be installed on each physical SP while that physical SP is free of VSPs, i.e., with the moved VSPs residing on one or more remaining physical SPs of the data storage apparatus. Moreover, the new version of the software is capable of being backwards compatible so that once all of the physical SPs have the new version installed, a coordinated switchover can take place which commits the data storage apparatus to operating in accordance with a new mode that is different from the backwards compatible mode.

Data Storage Apparatus Details

An improved technique for managing host data in a data storage apparatus provides virtualized storage processors (VSPs) as substantially self-describing and independent entities. Each VSP has its own namespace, which is independent of the namespace of any other VSP. Each VSP also has its own network address. Hosts may thus access VSPs directly, without having to include path information relative to the SP on which the VSPs are operated. VSPs can thus be moved from one physical SP to another with little or no disruption to hosts, which may in many cases continue to access the VSPs on the new SPs using the same paths as were used to access the VSPs on the original SPs.

In some examples, each VSP includes within its namespace a configuration file system storing configuration settings for operating the VSP. These configuration settings include, for example, network interface settings and internal settings that describe the VSPs "personality," i.e., the manner in which the VSP interacts on the network. By providing these settings as part of the VSP itself (e.g., within the file systems of the VSP), the VSP can be moved from one physical SP to another substantially as a unit. The increased independence of the VSP from its hosting SP promotes many aspects of VSP management, including, for example, migration, replication, failover, trespass, multi-tenancy, load balancing, and gateway support.

In some examples, the independence of VSPs is further promoted by storing data objects of VSPs in the form of respective files. These data objects may include, for example, file systems, LUNs, virtual storage volumes (vVols), and virtual machine disks (VMDKs). Each such file is part of a set of internal file systems of the data storage apparatus. Providing data objects in the form of files of a set of internal file systems promotes independence of VSPs and unifies management of file-based objects and block-based objects.

In accordance with improvements hereof, certain embodiments are directed to a method of managing host data on a data storage apparatus connected to a network. The method includes storing a network address and a set of host data objects accessible within a namespace of a virtualized storage processor (VSP) operated by a physical storage processor of the data storage apparatus. The namespace includes only names of objects that are specific to the VSP. The method further includes receiving, by the physical storage processor, a transmission over the network from a host computing device. The transmission is directed to a network address and includes an IO request designating a pathname to a host data object to be written or read. The method still further includes identifying the host data object designated by the IO request by (i) matching the network address to which the transmission is directed with the network address stored for the VSP, to identify the VSP as the recipient of the IO request, and (ii) locating the host data object within the namespace of the VSP using the pathname. The IO request is then processed to complete the requested read or write operation on the identified host data object.

Other embodiments are directed to computerized apparatus and computer program products. Some embodiments involve activity that is performed at a single location, while other embodiments involve activity that is distributed over a computerized environment (e.g., over a network).

An improved technique for managing host data in a data storage apparatus provides virtualized storage processors (VSPs) as substantially self-describing and independent constructs.

FIG. 1 shows an example environment 100 in which embodiments of the improved technique hereof can be practiced. Here, multiple host computing devices ("hosts") 110(1) through 110(N), access a data storage apparatus 116 over a network 114. The data storage apparatus 116 includes a physical storage processor, or "SP," 120 and storage 180. The storage 180 is provided, for example, in the form of hard disk drives and/or electronic flash drives. Although not shown in FIG. 1, the data storage apparatus 116 may include multiple SPs like the SP 120. For instance, multiple SPs may be provided as circuit board assemblies, or "blades," which plug into a chassis that encloses and cools the SPs. The chassis has a backplane for interconnecting the SPs, and additional connections may be made among SPs using cables. It is understood, however, that no particular hardware configuration is required, as any number of SPs (including a single one) can be provided and the SP 120 can be any type of computing device capable of processing host IOs.

The network 114 can be any type of network, such as, for example, a storage area network (SAN), local area network (LAN), wide area network (WAN), the Internet, some other type of network, and/or any combination thereof. In an example, the hosts 110(1-N) connect to the SP 120 using various technologies, such as Fibre Channel, iSCSI, NFS, SMB 3.0, and CIFS, for example. Any number of hosts 110(1-N) may be provided, using any of the above protocols, some subset thereof, or other protocols besides those shown. As is known, Fibre Channel and iSCSI are block-based protocols, whereas NFS, SMB 3.0, and CIFS are file-based protocols. The SP 120 is configured to receive IO requests 112(1-N) in transmissions from the hosts 110(1-N) according to both block-based and file-based protocols and to respond to such IO requests 112(1-N) by reading or writing the storage 180.

The SP 120 is seen to include one or more communication interfaces 122, control circuitry (e.g., a set of processors 124), and memory 130. The communication interfaces 122 include, for example, adapters, such as SCSI target adapters and network interface adapters, for converting electronic and/or optical signals received from the network 114 to electronic form for use by the SP 120. The set of processors 124 includes one or more processing chips and/or assemblies. In a particular example, the set of processors 124 includes numerous multi-core CPUs. The memory 130 includes both volatile memory (e.g., RAM), and non-volatile memory, such as one or more ROMs, disk drives, solid state drives (SSDs), and the like. The set of processors 124 and the memory 130 are constructed and arranged to carry out various methods and functions as described herein. Also, the memory 130 includes a variety of software constructs realized in the form of executable instructions. When the executable instructions are run by the set of processors 124, the set of processors 124 are caused to carry out the operations of the software constructs. Although certain software constructs are specifically shown and described, it is understood that the memory 130 typically includes many other software constructs, which are not shown, such as various applications, processes, and daemons.

As shown, the memory 130 includes an operating system 134, such as Unix, Linux, or Windows™, for example. The operating system 134 includes a kernel 136. The memory 130 is further seen to include a container 132. In an example, the container 132 is a software process that provides an isolated userspace execution context within the operating system 134. In various examples, the memory 130 may include multiple containers like the container 132, with each container providing its own isolated userspace instance. Although containers provide isolated environments that do not directly interact (and thus promote fault containment), different containers can be run on the same kernel 136 and can communicate with one another using inter-process communication (IPC) mediated by the kernel 136. Containers are well-known features of Unix, Linux, and other operating systems.

In the example of FIG. 1, only a single container 132 is shown. Running within the container 132 is an IO stack 140 and multiple virtualized storage processors (VSPs) 150(1-3). The IO stack 140 provides an execution path for host IOs (e.g., 112(1-N)) and includes a front end 142 and a back end 144. The VSPs 150(1-3) each run within the container 132 and provide a separate context for managing host data. In an example, each VSP manages a respective set of host file systems and/or other data objects and uses servers and settings for communicating over the network 114 with its own individual network identity. Although three VSPs are shown, it is understood that the SP 120 may include as few as one VSP or as many VSPs as the computing resources of the SP 120 and storage resources of the storage 180 allow.

Although the VSPs 150(1-3) each present an independent and distinct identity, it is evident that the VSPs 150(1-3) are not, in this example, implemented as independent virtual machines. Rather, all VSPs 150(1-3) operate in userspace and employ the same kernel 136 of the SP 120. Although it is possible to implement the VSPs 150(1-3) as independent virtual machines (each including a virtualized kernel), it has been observed that VSPs perform faster when the kernel 136 is not virtualized.

Also, it is observed that the VSPs 150(1-3) all run within the container 132, i.e., within a single userspace instance. Again, the arrangement shown reflects a deliberate design choice aimed at optimizing VSP performance. It is understood, though, that alternative implementations could provide different VSPs in different containers, or could be provided without containers at all.

The memory 130 is further seen to store a configuration database 170. The configuration database 170 stores system configuration information, including settings related to the VSPs 150(1-3) and their data objects. In other implementations, the configuration database 170 is stored elsewhere in the data storage apparatus 116, such as on a disk drive separate from the SP 120 but accessible to the SP 120, e.g., over a backplane or network.

In operation, the hosts 110(1-N) issue IO requests 112(1-N) to the data storage apparatus 116. The IO requests 112(1-N) may include both block-based requests and file-based requests. The SP 120 receives the IO requests 112(1-N) at the communication interfaces 122 and passes the IO requests to the IO stack 140 for further processing.

At the front end 142 of the IO stack 140, processing includes associating each of the IO requests 112(1-N) with a particular one of the VSPs 150(1-3). In an example, each VSP stores a network address (e.g., an IP address) in a designated location within its file systems. The front end 142 identifies the network address to which each IO request is directed and matches that address with one of the network addresses stored with the VSPs 150(1-3). The front end 142 thus uses the network address to which each IO request is sent to identify the VSP to which the IO request is directed. Further processing of the IO request is then associated (e.g., tagged) with an identifier of the matching VSP, such that the IO request is processed within a particular VSP context. Any data logging, metrics collection, fault reporting, or messages generated while the IO request is being processed are stored with the associated VSP (e.g., in a file system dedicated to the VSP). Also, any path information provided with the IO request (e.g., to a particular directory and file name) is interpreted within the namespace of the identified VSP.

Processing within the front end 142 may further include caching data provided with any write IOs and mapping host data objects (e.g., host file systems, LUNs, vVols, VMDKs, etc.) to underlying files stored in a set of internal file systems. Host IO requests received for reading and writing both file systems and LUNs are thus converted to reads and writes of respective files. The IO requests then propagate to the back end 144, where commands are executed for reading and/or writing the physical storage 180.

In an example, processing through the IO stack 140 is performed by a set of threads maintained by the SP 120 in a set of thread pools. When an IO request is received, a thread is selected from the set of thread pools. The IO request is tagged with a VSP identifier, and the selected thread runs with the context of the identified VSP. Typically, multiple threads from different thread pools contribute to the processing of each IO request (there are many processing layers). Multiple threads from the thread pools can process multiple IO requests simultaneously, i.e., in parallel, on the data objects of any one VSP or multiple VSPs.

Although FIG. 1 shows the front end 142 and the back end 144 together in an "integrated" form, the front end 142 and back end 144 may alternatively be provided on separate SPs. For example, the IO stack 140 may be implemented in a "modular" arrangement, with the front end 142 on one SP and the back end 144 on another SP. The IO stack 140 may further be implemented in a "gateway" arrangement, with multiple SPs running respective front ends 142 and with a back end provided within a separate storage array. The back end 144 performs processing that is similar to processing natively included in many block-based storage arrays. Multiple front ends 142 can thus connect to such arrays without the need for providing separate back ends. In all arrangements, processing through both the front end 142 and back end 144 is preferably tagged with the particular VSP context such that the processing remains VSP-aware.

Figure 2:
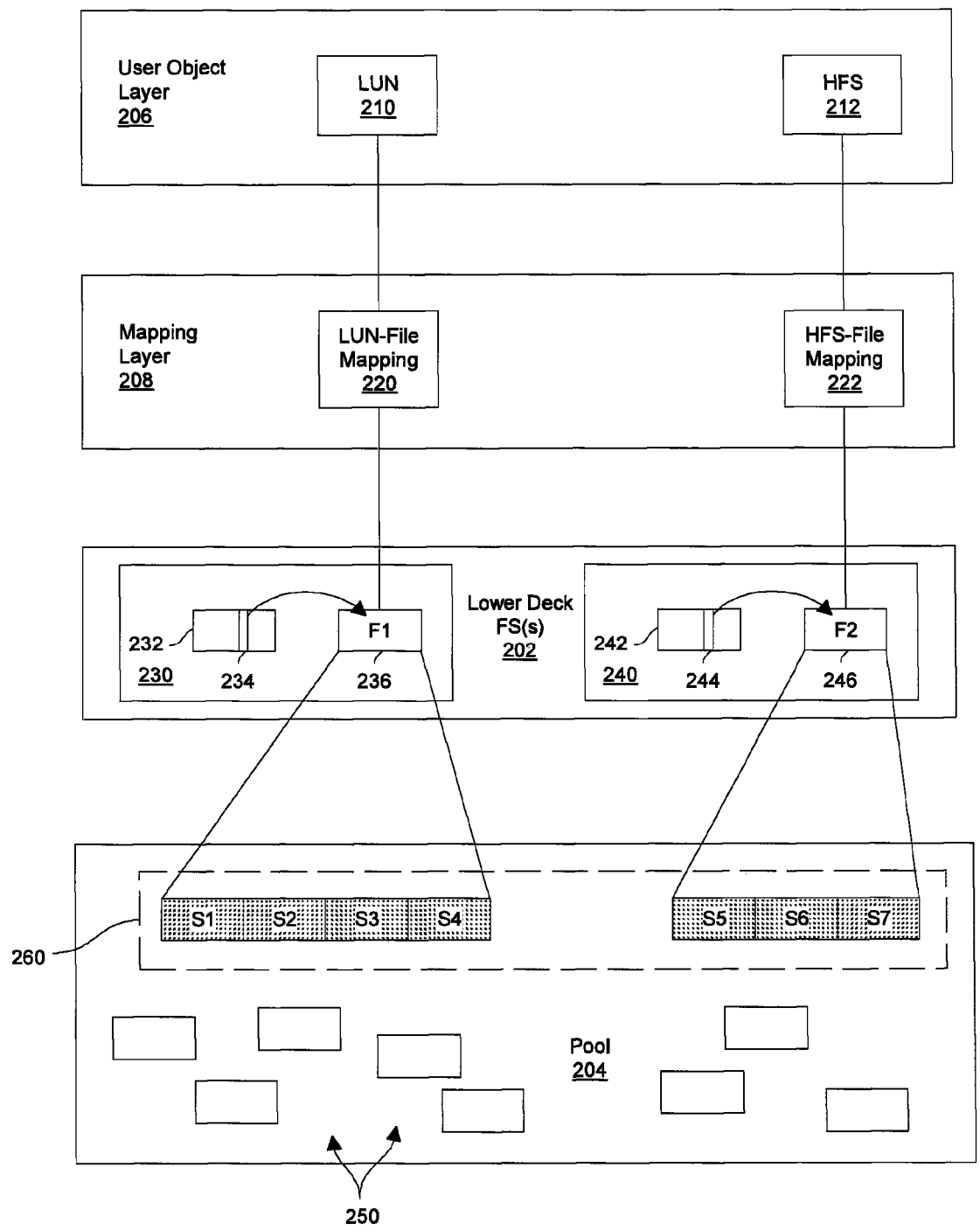
FIG. 2 is a block diagram showing example features of the front end of FIG. 1 in additional detail.

FIG. 2 shows portions of the front end 142 in additional detail. Here, and describing the architecture generally without regard to any particular VSP, it is seen that a set of lower-deck file systems 202 represents LUNs and host file systems in the form of files. Any number of lower-deck file systems 202 may be provided. In one arrangement, a single lower-deck file system may include, as files, any number of LUNs and/or host file systems, as well as their snaps (i.e., point-in-time copies). In another arrangement, a different lower-deck file system is provided for each primary object to be stored, e.g., for each LUN and for each host file system. Additional arrangements provide groups of host file systems and/or groups of LUNs together in a single lower deck file system. The lower-deck file system for any object may include a file storing the object itself, as well as files storing any snaps of the object. Each lower-deck file system 202 has an inode table (e.g., 232, 242), which provides a unique inode for each file stored in the lower-deck file system. The inode table of each lower-deck file system stores properties of each file in the respective lower-deck file system, such as ownership and block locations at which the file's data are stored. Lower-deck file systems are built upon storage elements managed by a storage pool 204.

The storage pool 204 organizes elements 250 of the storage 180 in the form of slices. A "slice" is an increment of storage space, such as 256 MB in size, which is obtained from the storage 180. The pool 204 may allocate slices to lower-deck file systems 202 for use in storing their files. The pool 204 may also deallocate slices from lower-deck file systems 202 if the storage provided by the slices is no longer required. In an example, the storage pool 204 creates slices by accessing RAID groups formed from the storage 180, dividing the RAID groups into FLUs (Flare LUNs), and further dividing the FLU's into slices.

Continuing with reference to the example shown in FIG. 2, a user object layer 206 includes a representation of a LUN 210 and of an HFS (host file system) 212, and a mapping layer 208 includes a LUN-to-file mapping 220 and an HFS-to-file mapping 222. The LUN-to-file mapping 220 maps the LUN 210 to a first file F1 (236), and the HFS-to-file mapping 222 maps the HFS 212 to a second file F2 (246). Through the LUN-to-file mapping 220, any set of blocks identified in the LUN 210 by a host IO request is mapped to a corresponding set of blocks within the first file 236. Similarly, through the HFS-to-file mapping 222, any file or directory of the HFS 212 is mapped to a corresponding set of blocks within the second file 246. The HFS 212 is also referred to herein as an "upper-deck file system," which is distinguished from the lower-deck file systems 202, which are for internal use.

In this example, a first lower-deck file system 230 includes the first file 236 and a second lower-deck file system 240 includes the second file 246. Each of the lower-deck file systems 230 and 240 includes an inode table (232 and 242, respectively). The inode tables 232 and 242 provide information about files in respective lower-deck file systems in the form of inodes. For example, the inode table 232 of the first lower-deck file system 230 includes an inode 234, which provides file-specific information about the first file 236. Similarly, the inode table 242 of the second lower-deck file system 240 includes an inode 244, which provides file-specific information about the second file 246. The information stored in each inode includes location information (e.g., block locations) where the respective file is stored, and may thus be accessed as metadata to identify the locations of the files 236 and 246 in the storage 180.

Although a single file is shown for each of the lower-deck file systems 230 and 240, it is understood that each of the lower-deck file systems 230 and 240 may include any number of files, each with its own entry in the respective inode table. In one example, each lower-deck file system stores not only the file F1 or F2 for the LUN 210 or HFS 212, but also snaps of those objects. For instance, the first lower-deck file system 230 stores the first file 236 along with a different file for every snap of the LUN 210. Similarly, the second lower-deck file system 240 stores the second file 246 along with a different file for every snap of the HFS 212.

As shown, a set of slices 260 is allocated by the storage pool 204 for storing the first file 236 and the second file 246. In the example shown, slices S1 through S4 are used for storing the first file 236, and slices S5 through S7 are used for storing the second file 246. The data that make up the LUN 210 are thus stored in the slices S1 through S4, whereas the data that make up the HFS 212 are stored in the slices S5 through S7.

In some examples, each of the lower-deck file systems 230 and 240 is associated with a respective volume, such as a sparse LUN. Sparse LUNs provide an additional layer of mapping between the lower-deck file systems 202 and the pool 204 and allow the lower-deck file systems to operate as file systems normally do, by accessing underlying volumes. Additional details about sparse LUNs and their relation to lower-deck file systems may be found in U.S. Pat. No. 7,631,155, which is hereby incorporated by reference in its entirety. The incorporated patent uses the term "container file system" to refer to a construct similar to the lower-deck file system disclosed herein.

Although the example of FIG. 2 shows storage of a LUN 210 and a host file system 212 in respective lower-deck file systems 230 and 240, it is understood that other data objects may be stored in one or more lower-deck file systems in a similar manner. These may include, for example, file-based vVols, block-based vVols, and VMDKs.

Figure 3:
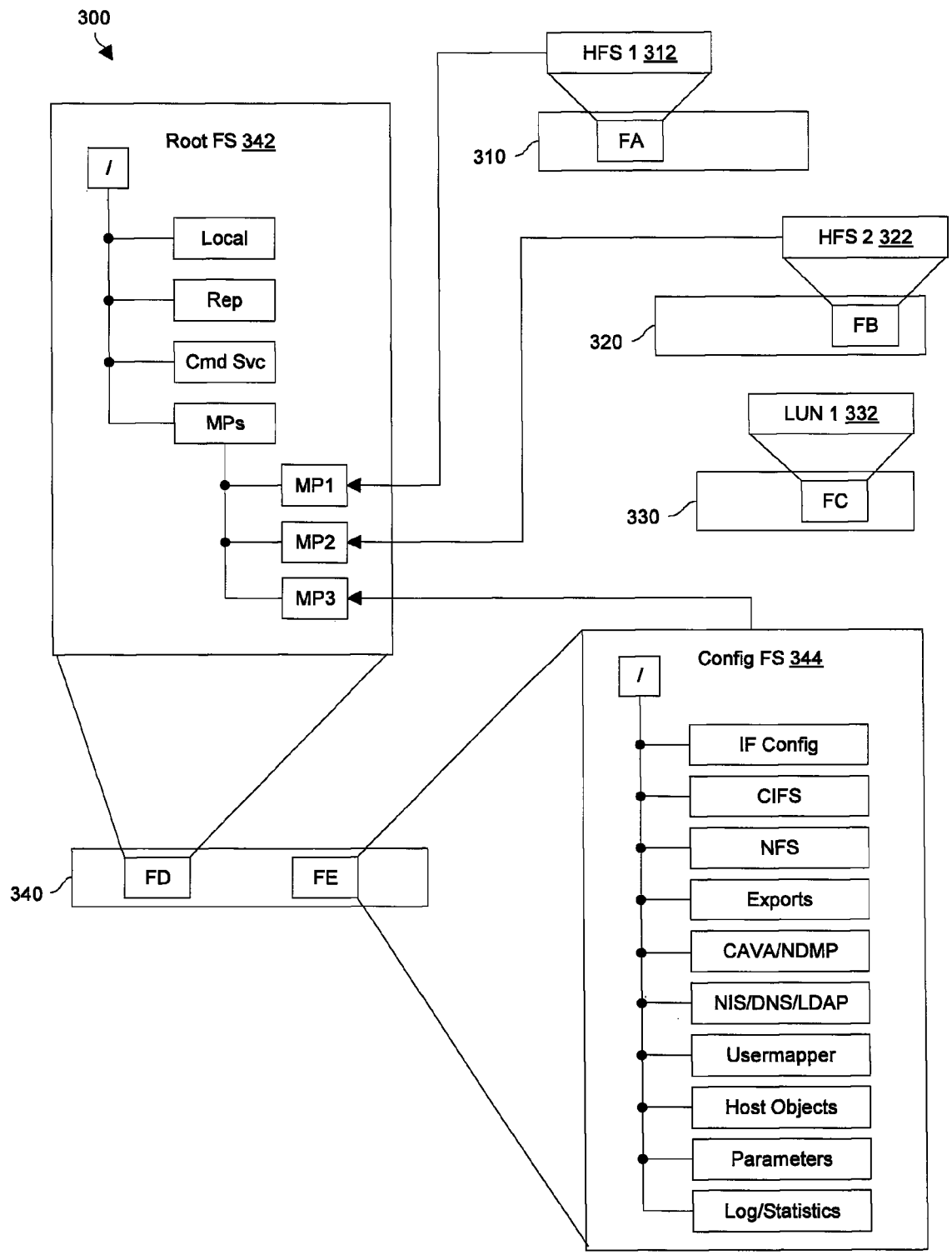
FIG. 3 is a block diagram showing an example set of file systems of a VSP of FIG. 1.

FIG. 3 shows an example set of components of the data storage apparatus 116 that are associated with a particular VSP 300 (i.e., any of the VSPs 150(1-3)). The components shown in FIG. 3 include components that are managed in the context of the VSP 300 and components that form the "personality" of the VSP 300. These components may be referred to herein as "included" within the VSP 300, by which it is meant that the components are associated with the VSP 300 within the data storage apparatus 116 and are not associated with any other VSP. It is thus seen that the VSP 300 "includes" a number of lower-deck file systems hosting various host data objects, as well as internal data objects.

For example, the VSP 300 includes a first lower-deck file system 310 and a second lower-deck file system 320. The first lower-deck file system 310 includes a file FA, which provides a file representation of a first host file system 312. Similarly, the second lower-deck file system 320 includes a file FB, which provides a file representation of a second host file system 322. The host file systems 312 and 322 are upper-deck file systems, which may be made available to hosts 110(1-N) for storing file-based host data. HFS-to-file mappings, like the HFS-to-file mapping 222, are understood to be present (although not shown in FIG. 3) for expressing the files FA and FB in the form of upper-deck file systems. Although only two host file systems 312 and 322 are shown, it is understood that the VSP 300 may include any number of host file systems. In an example, a different lower-deck file system is provided for each host file system. The lower-deck file system stores the file representation of the host file system, and, if snaps are turned on, any snaps of the host file system. In a similar manner to that described in connection with FIG. 2, each of the lower-deck file systems 310 and 320 includes a respective inode table, allowing the files FA and FB and their snaps to be indexed within the respective lower-deck file systems and accessed within the storage 180.

In some examples, the VSP 300 also includes one or more lower-deck file systems for storing file representations of LUNs. For example, a lower-deck file system 330 stores a file FC, which provides a file representation of a LUN 332. A LUN-to-file mapping (not shown but similar to the mapping 320) expresses the file FC in the form of a LUN, which may be made available to hosts 110(1-N) for storing block-based host data. In an example, the lower-deck file system 330 stores not only the file FC, but also snaps thereof, and includes an inode table in essentially the manner described above.

The VSP 300 further also includes a lower-deck file system 340. In an example, the lower-deck file system 340 stores file representations FD and FE of two internal file systems of the VSP 300—a root file system 342 and a configuration file system 344. In an alternative arrangement, the files FD and FE are provided in different lower-deck file systems. In an example, the lower-deck file system 340 also stores snaps of the files FD and FE, and files are accessed within the lower-deck file system 340 via file system-to-file mappings and using an inode table, substantially as described above.

In an example, the root file system 342 has a root directory, designated with the slash ("\"), and sub-directories as indicated. Any number of sub-directories may be provided within the root file system in any suitable arrangement with any suitable file structure; the example shown is merely illustrative. As indicated, one sub-directory ("Local") stores, for example, within constituent files, information about the local environment of the SP, such as local IP sub-net information, geographical location, and so forth. Another sub-directory ("Rep") stores replication information, such as information related to any ongoing replication sessions. Another sub-directory ("Cmd Svc") stores command service information, and yet another sub-directory ("MPs") stores mount points.

In the example shown, the directory "MPs" of the root file system 342 provides mount points (e.g., directories) on which file systems are mounted. For example, the host file systems 312 and 322 are respectively mounted on mount points MP1 and MP2, and the configuration file system 344 is mounted on the mount point MP3. In an example, establishment of the mount points MP1-MP3 and execution of the mounting operations for mounting the file systems 312, 322, 344 onto the mount points MP1-MP4 are provided in a batch file stored in the configuration file system 344 (e.g., in Host Objects). It is understood that additional mount points may be provided for accommodating additional file systems.

The root file system 342 has a namespace, which includes the names of the root directory, sub-directories, and files that belong to the root file system 342. The file systems 312, 322, and 344 also each have respective namespaces. The act of mounting the file systems 312, 322, and 344 onto the mount points MP1, MP2, and MP3 of the root file system 342 serves to join the namespace of each of the file systems 312, 322, and 344 with the namespace of the root file system 342, to form a single namespace that encompasses all the file systems 312, 322, 342, and 344. This namespace is specific to the VSP 300 and is independent of namespaces of any other VSPs.

Also, it is understood that the LUN 332 is also made available to hosts 110(1-N) through the VSP 300. For example, hosts 110(1-N) can send read and write IO requests to the LUN 332 (e.g., via Fibre Channel and/or iSCSI commands) and the SP 120 services the requests for the VSP 300, e.g., by operating threads tagged with the context of the VSP 300. Although FIG. 3 shows both the LUN 322 and the host file systems 312 and 322 together in a single VSP 300, other examples may provide separate VSPs for LUNs and for file systems.

Although the VSP 300 is seen to include file systems and LUNs, other host objects may be included, as well. These include, for example, file-based vVols, block-based vVols, and VMDKs. Such host objects may be provided as file representations in lower-deck file systems and made available to hosts 110(1-N).

As its name suggests, the configuration file system 344 stores configuration settings for the VSP 300. These settings include settings for establishing the "personality" of the VSP 300, i.e., the manner in which the VSP 300 interacts over the network 114. Although the configuration file system 344 is shown with a particular directory structure, it is understood that any suitable directory structure can be used. In an example, the configuration file system 344 stores the following elements:

IF Config.

Interface configuration settings of any network interface used for processing IO requests and tagged with a context of the VSP 300. IF Config includes the IP address of the VSP, as well as related network information, such as sub-masks and related IP information.

CIFS.

Configuration settings and names of one or more CIFS servers used in the context of the VSP 300. The CIFS servers manage IO requests provided in the CIFS protocol. By including the CIFS configuration within the configuration file system 344, the CIFS configuration becomes part of the VSP 300 itself and remains with the VSP 300 even as the VSP 300 is moved from one SP to another SP. This per-VSP configuration of CIFS also permits each VSP to have its own customized CIFS settings, which may be different from the settings of CIFS servers used by other VSPs.

NFS.

Configuration settings and names of one or more NFS servers used in the context of the VSP 300. The NFS servers manage IO requests provided in the NFS protocol. By including the NFS configuration within the configuration file system 344, the NFS configuration becomes part of the VSP 300 itself and remains with the VSP 300 even as the VSP 300 is moved from one SP to another SP. This per-VSP configuration of NFS also permits each VSP to have its own customized NFS settings, which may be different from the settings of NFS servers used by other VSPs.

Exports.

NFS exports, CIFS shares, and the like for all supported protocols. For security and management of host access, users are typically given access only to specified resources mounted to the root file system 342, e.g., host file systems, sub-directories of those file systems, and/or particular LUNs. Access to these resources is provided by performing explicit export/share operations, which expose entry points to the resources for host access. In an example, these export/share operations are included within one or more batch files, which may be executed when the VSP 300 is started. Exports are typically VSP-specific, and depend upon the particular data being hosted and the access required.

CAVA/NDMP:

CAVA (Celerra Anti-Virus Agent) configuration file, including location of external server for performing virus checking operations. NDMP (Network Data Management Protocol) provides backup configuration information. CAVA and NDMP settings are configurable on a per-VSP basis.

NIS/DNS/LDAP:

Local configurations and locations of external servers for providing resolution of IP addresses. NIS (Network Information Service), DNS (Directory Name System), and LDAP (Lightweight Directory Access Protocol) settings are configurable on a per-VSP basis. The DNS configuration stores local host name and domain name of the VSP 300, as well as the location of a DNS server for resolving host names.

Host Objects:

Identifiers for all host file systems (e.g., 312 and 322), LUNs (e.g., LUN 332), and other host objects included within the VSP 300. Host objects may also include batch files and/or lists of instructions for establishing mount points in the root file system 342 and for mounting the host file system(s) and LUN(s) to the mount points.

Parameters:

Low-level settings (e.g., registry settings) for configuring VSP 300. These include cache settings and settings for specifying a maximum number of threads running on the SP 120 that may be used to service IO requests within the context of the VSP 300. Parameters are configurable on a per-VSP basis.

Statistics:

Metrics, log files, and other information pertaining to activities within the context of the VSP 300. Statistics are updated as they accumulate.

Many configuration settings are established at startup of the VSP 300. Some configuration settings are updated as the VSP 300 is operated. The configuration file system 344 preferably does not store host data.

Although FIG. 3 has been shown and described with reference to a particular VSP 300, it is understood that all of the VSPs 150(1-3) may include a root file system, a configuration file system, and at least one host file system or LUN, substantially as shown. Particular host objects and configuration settings differ, however, from one VSP to another.

By storing the configuration settings of VSPs within the file systems of the VSPs themselves and providing a unique namespace for each VSP, VSPs are made to be highly independent, both of other VSPs and of the particular SPs on which they are provided. For example, migrating a VSP from a first data storage system to a second data storage system involves copying its lower-deck file systems (or some subset thereof) from a source SP on the first data storage system to a target SP on the second, starting the VSP's servers on the target SP in accordance with the configuration settings, and resuming operation on the target SP. As the paths for accessing data objects on VSPs are not rooted to the SPs on which they are run, hosts may often continue to access migrated VSPs using the same instructions as were used prior to moving the VSPs. Similar benefits can be enjoyed when moving a VSP from one SP to another SP in the same data storage system. storage system. To move a VSP from a first SP to a second SP, The VSP need merely be shut down (i.e., have its servers stopped) on the first SP and resumed (i.e., have its servers started up again) on the second SP.

FIG. 4 shows an example record 400 of the configuration database 170, which are used to define a particular VSP having a VSP identifier (ID) 410. The VSP ID 410 may identify one of the VSPs 150(1-3) or some other VSP of the data storage apparatus 116. The record 400 specifies, for example, an owning SP (physical storage processor), authentication, and identifiers of the data objects associated with the listed VSP. The data object identifiers include identifiers of the root file system, configuration file system, and various host file systems (or other host objects) that may be accessed in the context of the listed VSP. The record 400 may also identify the lower-deck file system used to store each data object. The record 400 may further specify host interfaces that specify IO protocols that the listed VSP is equipped to handle.

Although FIG. 4 shows only a single record 400 for a single VSP, it is understood that the configuration database 170 may store records, like the record 400, for any number of VSPs, including all VSPs of the data storage apparatus 116. During start-up of the data storage apparatus 116, or at some other time, a computing device of the data storage apparatus 116 reads the configuration database 170 and launches a particular VSP or a group of VSPs on the identified SPs. As a VSP is starting, the SP that owns the VSP reads the configuration settings of the configuration file system 344 to configure the various servers of the VSP and to initialize its communication protocols. The VSP may then be operated on the identified SP, i.e., the SP may then be operated with the particular VSP's context.

It is understood that VSPs 150(1-3) operate in connection with the front end 142 of the IO stack 140. The VSPs 150(1-3) thus remain co-located with their respective front ends 142 in modular and gateway arrangements.

FIGS. 5A and 5B show two different example arrangements of VSPs. In FIG. 5A, the VSPs 150(1-3) access the storage pool 204. Thus, the lower-deck file systems of the VSPs 150(1-3) all derive the slices needed to store their underlying file systems and other data objects from the pool 204. In FIG. 5B, multiple storage pools 550(1-3) are provided, one for each of the VSPs 150(1-3), respectively. Providing different pools for respective VSPs promotes data isolation among the VSPs, and may be better suited for applications involving multiple tenants in which each tenant's data must be kept separate from the data of other tenants.

Figure 6:
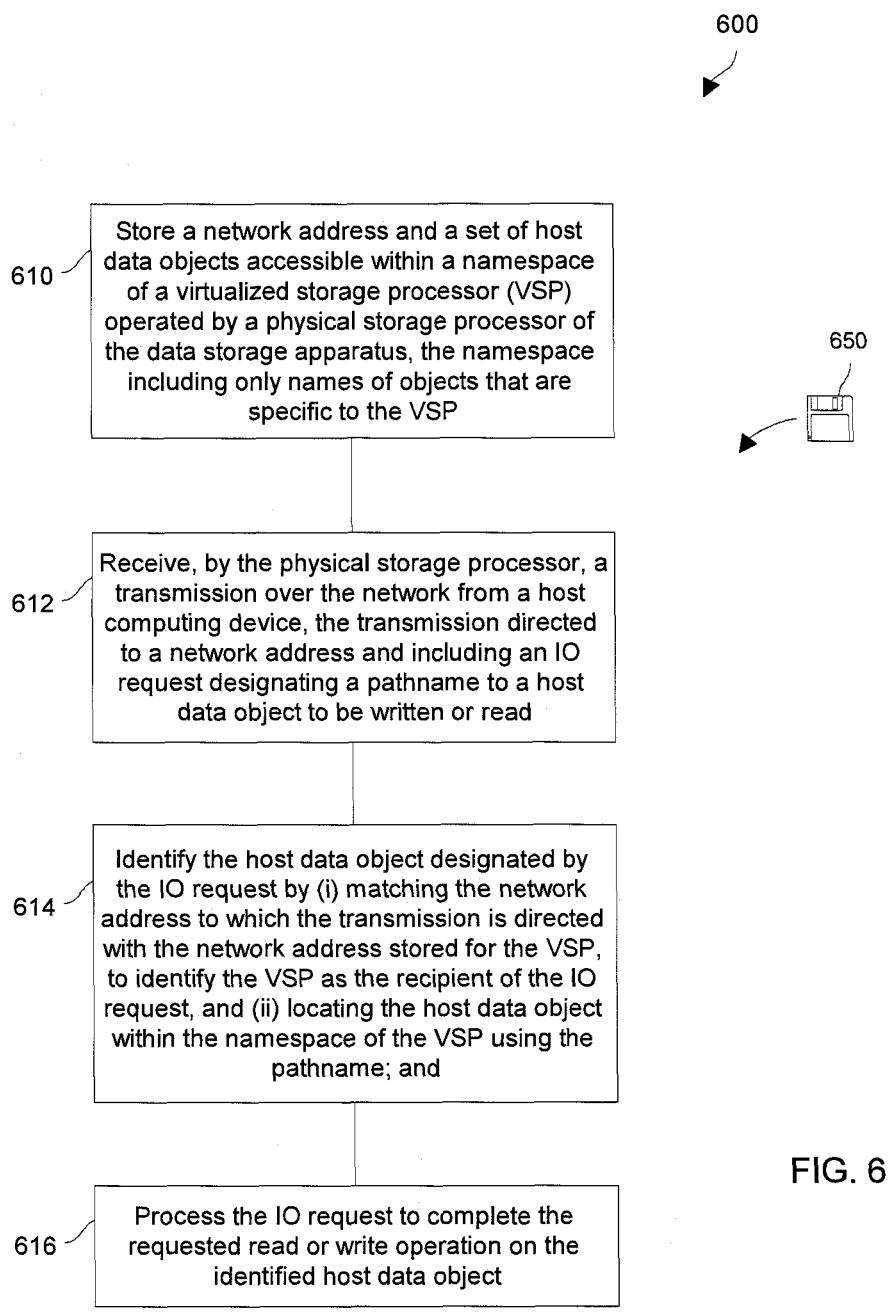
FIG. 6 is a flowchart showing an example process for managing host data using a VSP.

FIG. 6 shows an example method 600 for managing host data on a data storage apparatus connected to a network. The method 600 that may be carried out in connection with the data storage apparatus 116. The method 600 is typically performed by the software constructs, described in connection with FIGS. 1-3, which reside in the memory 130 of the storage processor 120 and are run by the set of processors 124. The various acts of the method 600 may be ordered in any suitable way. Accordingly, embodiments may be constructed in which acts are performed in orders different from those illustrated, which may include performing some acts simultaneously, even though the acts are shown as sequential in the illustrated embodiments.

At step 610, a network address and a set of host data objects are stored in a data storage apparatus. The set of host data objects are accessible within a namespace of a virtualized storage processor (VSP) operated by a physical storage processor of the data storage apparatus. The namespace includes only names of objects that are specific to the VSP. For example, an IP address of the VSP 300 is stored in a file of a directory of the configuration file system 344. The VSP 300 runs on the SP 120 of the data storage apparatus 116. A set of host objects, including host file systems 312 and 322, and LUN 332, are also stored in the data storage apparatus 116. These host objects are made accessible within the namespace of the VSP 300 by mounting these data objects to mount points MP1-MP4 within the root file system 342 and thus merging their namespaces with that of the root file system 342. The resulting merged namespace includes only names of objects that are specific to the VSP 300.

At step 612, a transmission is received by the physical storage processor over the network from a host computing device. The transmission is directed to a network address and includes an IO request designating a pathname to a host data object to be written or read. For example, the SP 120 receives a transmission over the network 114 from one of the hosts 110(1-N). The transmission is directed to a particular IP address and includes an IO request (e.g., one of 112(1-N)). The IO request designates a location of a host data object to be written or read (e.g., a pathname for a file-based object or a block designation for a block-based object). The location may point to any of the host file systems 312 or 322, to the LUN 332, or to any file or offset range accessible through the host file systems 312 or 322 or the LUN 332, respectively. The location may also point to a vVol or VMDK, for example, or to any other object which is part of the namespace of the VSP 300.

At step 614, the host data object designated by the IO request is identified by (i) matching the network address to which the transmission is directed with the network address stored for the VSP, to identify the VSP as the recipient of the IO request, and (ii) locating the host data object within the namespace of the VSP using the pathname. For example, each of the VSPs 150(1-3) stores an IP address in its configuration file system 344. When an IO request is received, an interface running within the front end 142 of the IO stack 140 checks the IP address to which the IO request is directed and matches that IP address with one of the IP addresses stored for the VSPs 150(1-3). The VSP whose IP address matches the IP address to which the IO request is directed is identified as the recipient of the IO request. The IO request arrives to the SP 120 with a pathname to the host data object to be accessed. The front end 142 looks up the designated pathname within the identified VSP to identify the particular data object to which the IO request is directed.

At step 616, the IO request is processed to complete the requested read or write operation on the identified host data object. For example, the front end 142 and the back end 144 process the IO request to perform an actual read or write to the designated host data object on the storage 180.

An improved technique has been described for managing host data in a data storage apparatus. The technique provides virtualized storage processors (VSPs) as substantially self-describing and independent entities. Each VSP has its own namespace, which is independent of the namespace of any other VSP. Each VSP also has its own network address. Hosts may thus access VSPs directly, without having to include path information relative to the SP on which the VSP is operated. VSPs can thus be moved from one physical SP to another with little or no disruption to hosts, which may continue to access the VSPs on the new SPs using the same paths as were used when the VSPs were running on the original SPs.

As used throughout this document, the words "comprising," "including," and "having" are intended to set forth certain items, steps, elements, or aspects in an open-ended fashion. Also, and unless explicitly indicated to the contrary, the word "set" as used herein indicates one or more of something. Although certain embodiments are disclosed herein, it is understood that these are provided by way of example only and the invention is not limited to these particular embodiments.

Having described certain embodiments, numerous alternative embodiments or variations can be made. For example, embodiments have been shown and described in which host file systems, LUNs, vVols, VMDKs, and the like are provided in the form of files of underlying lower-deck file systems. Although this arrangement provides advantages for simplifying management of VSPs and for unifying block-based and file-based operations, the use of lower-deck file systems is merely an example. Indeed, host file systems, LUNs, vVols, VMDKs, and the like may be provided for VSPs in any suitable way.

Also, although the VSPs 150(1-3) are shown and described as userspace constructs that run within the container 132, this is also merely an example. Alternatively, different VSPs may be provided in separate virtual machines running on the SP 120. For example, the SP 120 is equipped with a hypervisor and a virtual memory manager, and each VSP runs in a virtual machine having a virtualized operating system.

Also, the improvements or portions thereof may be embodied as a non-transient computer-readable storage medium, such as a magnetic disk, magnetic tape, compact disk, DVD, optical disk, flash memory, Application Specific Integrated Circuit (ASIC), Field Programmable Gate Array (FPGA), and the like (shown by way of example as medium 650 in FIG. 6). Multiple computer-readable media may be used. The medium (or media) may be encoded with instructions which, when executed on one or more computers or other processors, implement the various methods described herein. Such medium (or media) may be considered an article of manufacture or a machine, and may be transportable from one machine to another.

Non-Disruptive Upgrade Details

Figure 7:
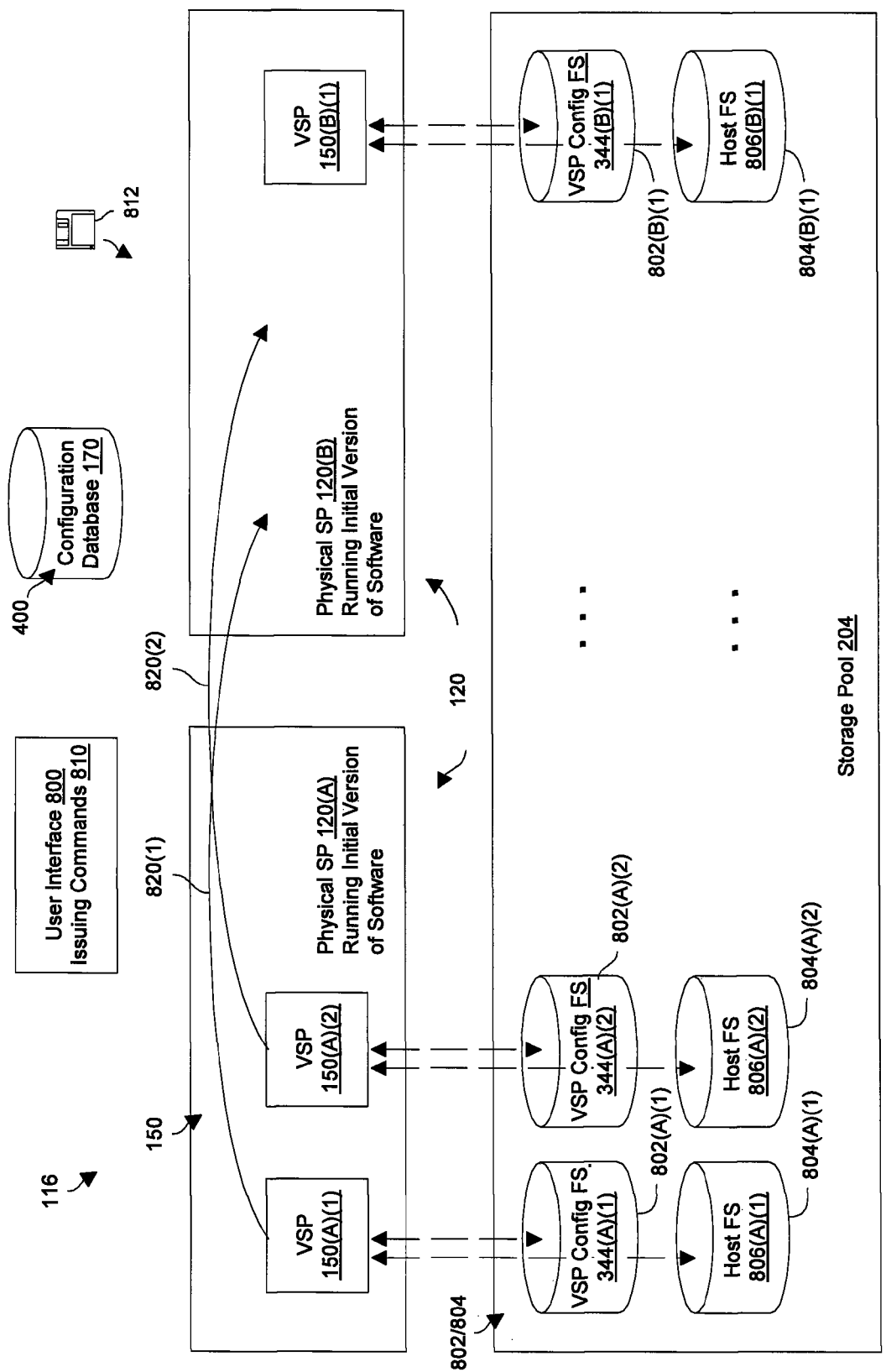
FIG. 7 is a block diagram of a non-disruptive upgrade (NDU) example at a first time, T1.
Figure 8:
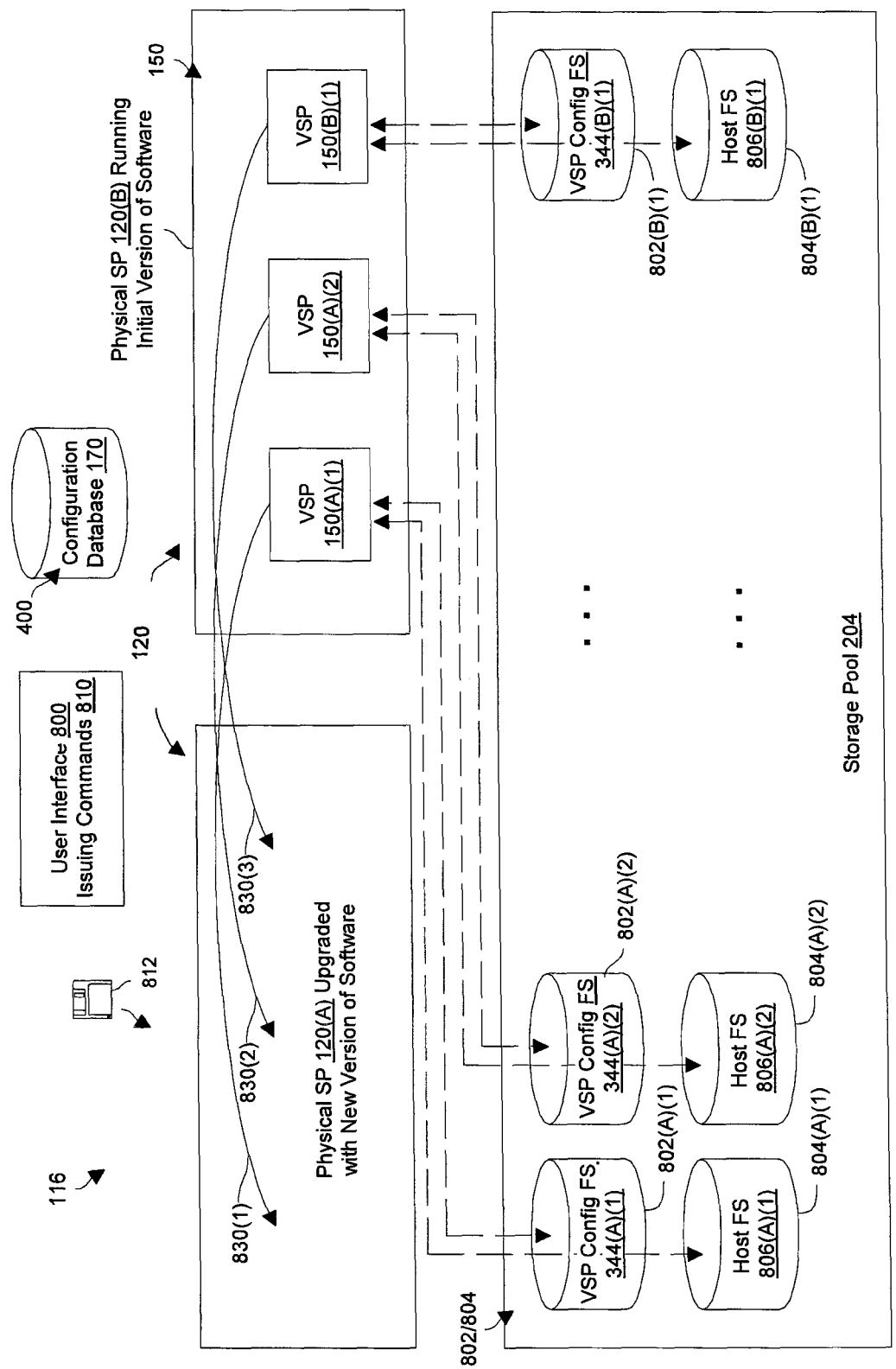
FIG. 8 is a block diagram of the NDU example at a second time, T2, which is after T1.
Figure 9:
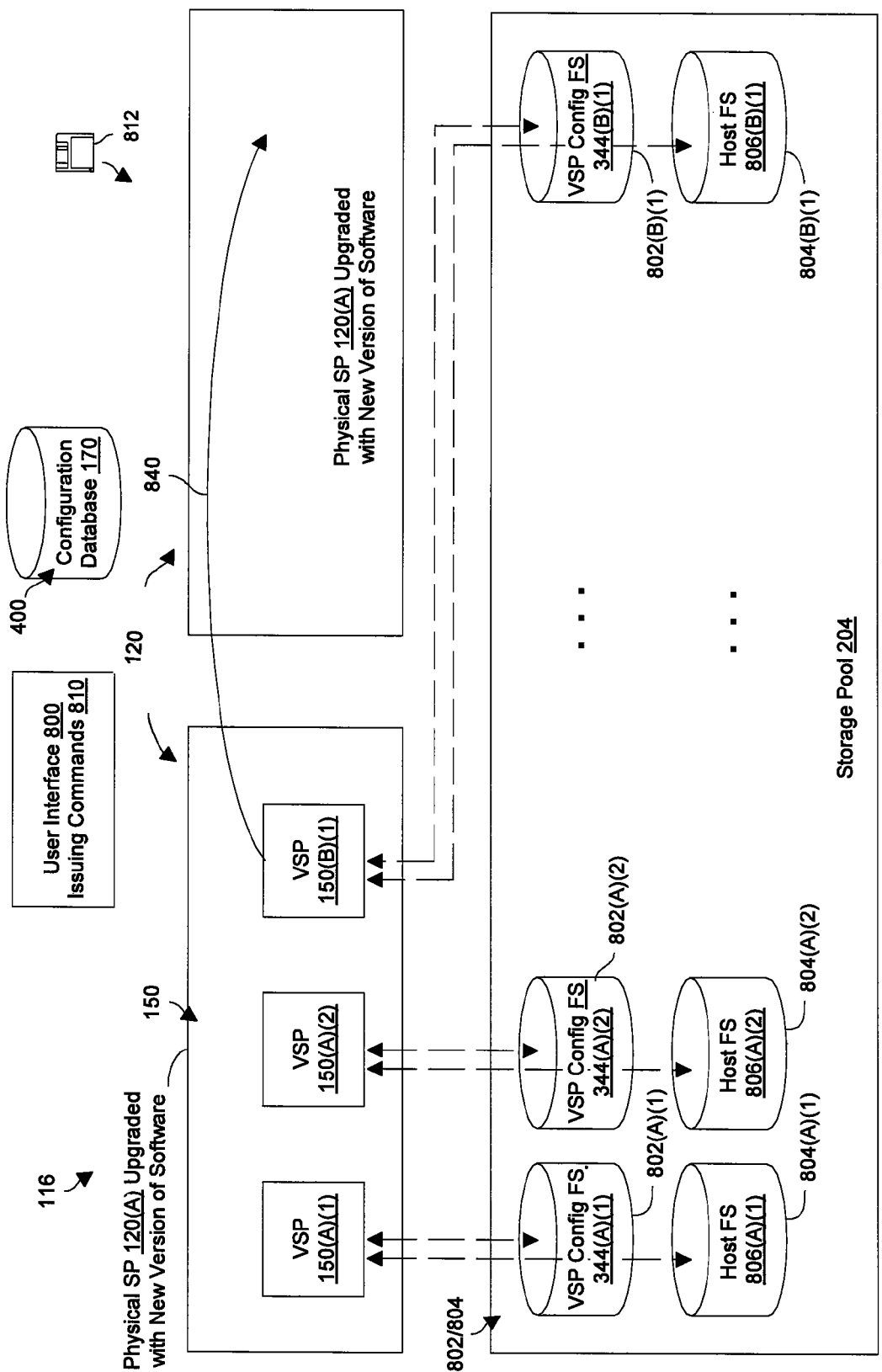
FIG. 9 is a block diagram of the NDU example at a third time, T3, which is after T2.
Figure 10:
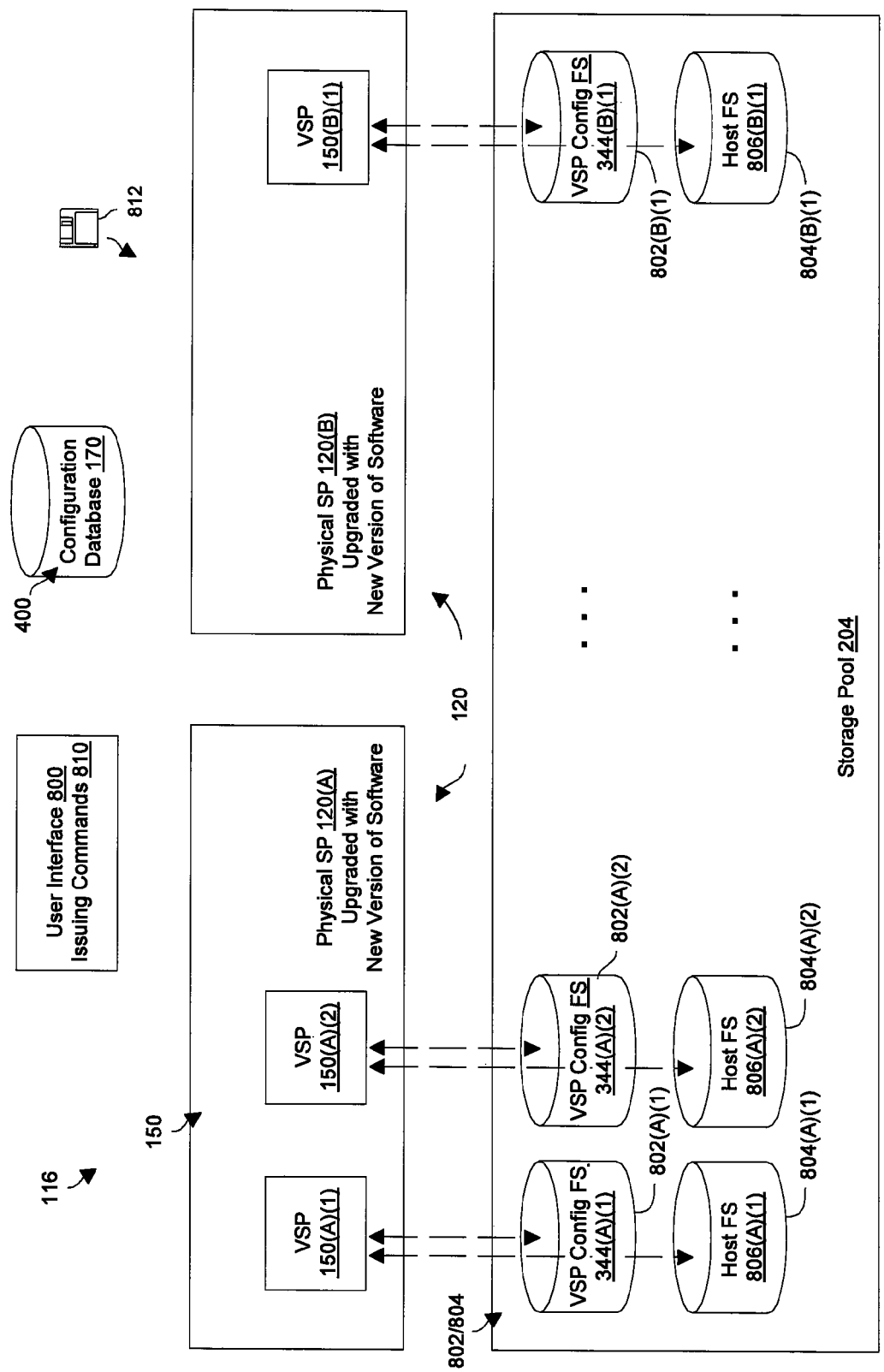
FIG. 10 is a block diagram of the NDU example at a fourth time, T4, which is after T3.

FIGS. 7-10 illustrate non-disruptive upgrade of a data storage apparatus 116. FIG. 7 shows two physical SPs 120(A), 120(B) (collectively, physical SPs 120) at a first operating time, T1, at the beginning of NDU. FIG. 8 shows the physical SPs 120 at a second operating time, T2, after T1. FIG. 9 shows the physical SPs 120 at a third operating time, T3, after T2. FIG. 10 shows the physical SPs 120 at a fourth operating time, T4, after T3.

By way of example only, there is a storage pool 204, a user interface 800, and a configuration database 170. The storage pool 204 is formed from a set of storage units and, as mentioned earlier, contains a set of lower deck file systems 202 (also see FIG. 2). The user interface 800 takes input from and provides output to a user (e.g., an administrator) and may take the form of a user workstation or terminal in communication with the processing circuitry (i.e., the physical SPs 120) of the data storage apparatus 116 to provide the user with a command line interface or GUI.

As shown in FIG. 7, the storage pool 204 provides storage for VSPs 150(A)(1), 150(A)(2) which are owned by the physical SP 120(A). In particular, a lower-deck file 802(A)(1) contains a VSP configuration file system 344(A)(1) which defines a personality for the VSP 150(A)(1) (also see FIG. 3). Similarly, another lower-deck file 802(A)(2) contains another VSP configuration file system 344(A)(2) which defines a personality for the VSP 150(A)(2).

Additionally and as shown in FIG. 7, a lower-deck file 804(A)(1) contains a host file system 806(A)(1) for use by a host. Similarly, another lower-deck file 804(A)(2) contains another host file system 806(A)(2) for use by a host. The personalities, or operating environments in which the host file systems 806(A)(1), 806(A)(2) reside, are defined by the VSP configuration file systems 344(A)(1), 344(A)(2), respectively. Recall that the VSP configuration file systems 344 and host file systems 806 are mounted to the respective root file systems (or root structures) of the VSPs 150 (see dashed lines in FIGS. 7 and 8, and also see FIG. 3).

Furthermore and as shown in FIG. 7, the storage pool 204 further provides storage for a VSP 150(B)(1) which is owned by the physical SP 120(B). In particular, a lower-deck file 802(B)(1) contains a VSP configuration file system 344(B)(1) which defines a personality for the VSP 150(B)(1), and a lower-deck file 804(B)(1) contains a host file system 806(B)(1) for use by a host. Again, the VSP configuration file system 344(B)(1) and the host file system 806(B)(1) are mounted to the root file system of the VSP 150(B)(1).

It should be understood that the configuration database 170 includes a set of records 400 (also see FIG. 4) which is used to manage and track ownership of various constructs/objects of the data storage apparatus 116. Along these lines, the configuration database 170 indicates, for each VSP 150, a particular physical SP 120 that owns that VSP 150. Likewise, the configuration database 170 indicates, for each lower-deck file 802, 804, a particular VSP 150 that owns that that lower-deck file 802, 804 (i.e., the particular VSP to which that lower-deck file 802, 804 is mounted), and so on.

In this example, the physical SP 120(A) owns VSPs 150(A)(1), 150(A)(2). Similarly, the physical SP 120(B) owns VSP 150(B)(1). It should be understood that, in some situations, other storage pools 204 may storage other VSPs 150 and that the physical SPs 120 may own those other VSPs 150 in addition to the VSPs 150 shown in the figures.

During operating time T1 which is at the beginning of NDU, it should be understood that the physical SP 120(A) processes host input/output (I/O) requests directed to the host file systems 806(A)(1), 806(A)(2) which are mounted to the VSPs 150(A)(1), 150(A)(2), respectively. Similarly, the physical SP 120(B) processes host I/O requests directed to the host file system 806(B)(1) which is mounted to the VSP 150(B)(1). 150(B)(1).

Now, suppose that a user wishes to begin the NDU process. In some arrangements, the user enters a single upgrade command 810 via the user interface 800. In other arrangements, the user enters a series of upgrade-related commands 810 via the user interface 800 for more precise control and monitoring during the NDU process (i.e., to carry out NDU in a step by step manner). Accordingly, it should be understood that each step of the process may be performed sequentially in an automated manner (e.g., in response to a single user command 810) or in response to manually entered incremental user commands 810.

Initially and with reference to FIG. 7, an initial version of software is installed on each physical SP 120. In accordance with that initial version, each physical SP 120 may process host I/O requests in a particular manner or according to a particular protocol, e.g., using a particular order of operations, in a particular format, using a particular semantic, updating and/or relying on particular metadata, and so on.

However, the goal of the NDU process is to finish with a new version 812 of the software is installed on each physical SP 120, and with the placement of the VSPs 150 as originally shown in FIG. 7. Along these lines, the new version 812 is backwards compatible and, after NDU, each physical SP 120 may process host I/O requests in the same particular manner as with the initial version. Alternatively, each physical SP 120 may process host I/O requests in a different manner than that of the initial version if the data storage apparatus 116 is directed to commit to the new manner or new protocol of the new software version (i.e., to take advantage of the new features).

As shown by the arrows in FIG. 7, the VSPs 150(A)(1), 150(A)(2) on the physical SP 120(A) are moved from the physical SP 120(A) to the physical SP 120(B) (see the arrows 820(1), 820(2) in FIG. 7). As the VSPs 150 are moved from one physical SP 120 to another, the configuration database 170 is updated so that the current location of each VSP 150 is tracked by the data storage apparatus 116. It should be understood that "a VSP on a particular physical SP" is a general description meaning that the particular physical SP controls and has access to that VSP.

It should be further understood that transfer of the VSPs 150 between physical SPs 120 may occur incrementally. Such operation enables a particular VSP 150 to move from one physical SP 120 to another quickly without significant contention for resources thus providing the user with a high quality of service, e.g., high/continuous availability, fast response time, etc. Additionally, it should be understood that moving a VSP 150 may involve draining queues/caches/etc. and completing partially started operations prior to transferring the VSP 150 to another physical SP 120 in order to prevent data loss. Also, it should be understood that this transfer operation of a VSP 150 from one physical SP 120 to another physical SP 120 may be suitable for other activities such as load balancing VSPs 150 among physical SPs 120.

At time T2 and as shown in FIG. 8, there are no VSPs 150 currently on (i.e., accessed by) the physical SP 120(A). Rather, all of the VSPs 150 now reside on the physical SP 120(B). Accordingly, the physical SP 120(B) now processes all of the host I/O requests for the data storage apparatus 116.

Along these lines, the physical SP 120(B) processes host I/O requests directed to the host file systems 806(A)(1), 806(A)(2), 806(B)(1) which are mounted to the VSPs 150(A)(1), 150(A)(2), 150(B)(1), respectively.

At this point, the physical SP 120(A) is ready for installation of the new version 812 of the software. Accordingly, the new version 812 of the software is installed on the physical SP120(A) while the physical SP 120(B) continues to process all of the host I/O requests for the data storage apparatus 116.

Once the new version 812 of the software has been installed on the physical SP 120(A), the physical SP 120(A) is configured to operate in a backwards compatible mode. That is, even though the new software version 812 is running on the physical SP 120(A), the physical SP 120(A) is configured to process host I/O requests in the same manner as that for the initial software version. At this point, all of the VSPs 150 on the physical SP 120(B) are moved to the physical SP 120(A) (see the arrows 830(1), 830(2), 830(3) in FIG. 8), and the configuration database 170 is again updated.

At time T3 and as shown in FIG. 9, there are no VSPs 150 currently on the physical SP 120(B). Rather, all of the VSPs 150 now reside on the physical SP 120(A). In particular, the VSPs 150(A)(1), 150(A)(2) which started on the physical SP 120(A) as well as the VSP 150(B)(1) which started on the physical SP 120(B) have moved from the physical SP 120(B) to the physical SP 120(A). Accordingly, the physical SP 120(A) now processes all of the host I/O requests for the data storage apparatus 116. That is, the physical SP 120(A) processes host I/O requests directed to the host file systems 806(A)(1), 806(A)(2), 806(B)(1) which are mounted to the VSPs 150(A)(1), 150(A)(2), 150(B)(1), respectively.

At this point, the physical SP 120(B) is now ready for installation of the new version 812 of the software. Accordingly, the new version 812 of the software is installed on the physical SP120(B) while the physical SP 120(A) continues to process all of the host I/O requests for the data storage apparatus 116.

Once the new version of the software has been installed on the physical SP 120(B), the physical SP 120(B) is configured to operate in a backwards compatible mode. That is, even though the new software version 812 is running on the physical SP 120(B), the physical SP 120(B) is configured to process host I/O requests in the same manner as that for the initial software version. At this point, all of the VSPs 150 that are owned by the physical SP 120(B) (namely, the VSP 150(B)(1)) are moved back to the physical SP 120(B) (see arrow 840 in FIG. 9), and again the configuration database 170 is updated. The VSPs that are owned by the physical SP 120(A) (namely, the VSPs 150(A)(1), 150(A)(2)) remain on the physical SP 120(A).

At time T4 and as shown in FIG. 10, each VSP 150 resides on its primary owner and the NDU process is essential finished. In particular, the physical SP 120(A) processes host input/output (I/O) requests directed to the host file systems 806(A)(1), 806(A)(2) which are mounted to the VSPs 150(A)(1), 150(A)(2), respectively. Similarly, the physical SP 120(B) processes host I/O requests directed to the host file system 806(B)(1) which is mounted to the VSP 150(B)(1). Additionally, the new version 812 of the software is now installed on all of the physical SPs 120 which are currently running in backwards compatible mode to process host I/O requests in the same manner as that of the initial version of the software.

At this point, the user may commit the data storage apparatus 116 to processing host I/O requests in the manner of the new version 812 or according to the new protocol. Any new processing features or functions become available once the user commits to the new version 812 of the software. However, the user may decide not to commit the data storage apparatus 116 to processing host I/O requests in accordance with the new mode. Rather, the user may wish to continue operating the data storage apparatus 116 in backwards compatible mode to process I/O requests in the same manner as that of the initial version indefinitely, or until a more convenient switchover time.

If the user wishes to defer switchover indefinitely, the user enters a completion command 810. In response, the data storage apparatus 116 deems the NDU process to be complete and continues to operate with each physical SP 120 using the new version 812 of the software in the backward compatible mode.

Eventually, if the user is ready to process host I/O requests in the new manner, the user enters a switchover command 810 into the user interface 800. The physical SPs 120 respond to the switchover command 810 by processing newly received I/O requests in the new manner. It should be understood that the switchover process may involve draining queues/caches/etc. and completing partially started operations prior to switchover in order to prevent data loss.

It should be understood that the physical SPs 120 may be configured to concurrently handle file-based and block-based I/O requests from hosts. In these arrangements, the data storage apparatus 116 trespasses block-based processing among the physical SPs 120 in tandem with moving VSPs 150 among the physical SPs 120 to remove processing of all host I/O requests from each physical SP 120 when the new version 812 of the software is installed on that physical SP 120.

Figure 11A:
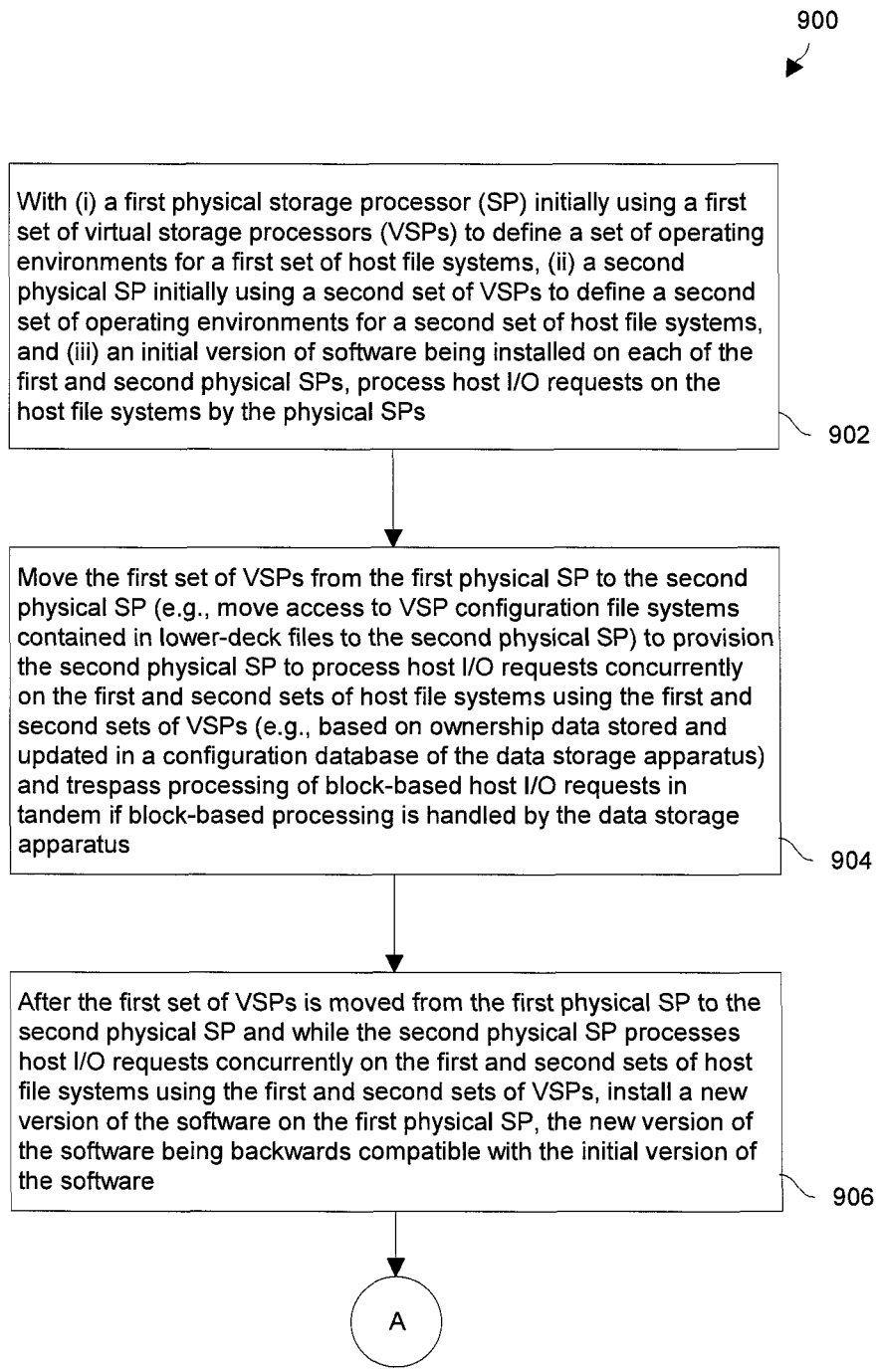
FIGS. 11A and 11B provide a flowchart of an NDU procedure which is performed on a data storage apparatus.
Figure 11B:
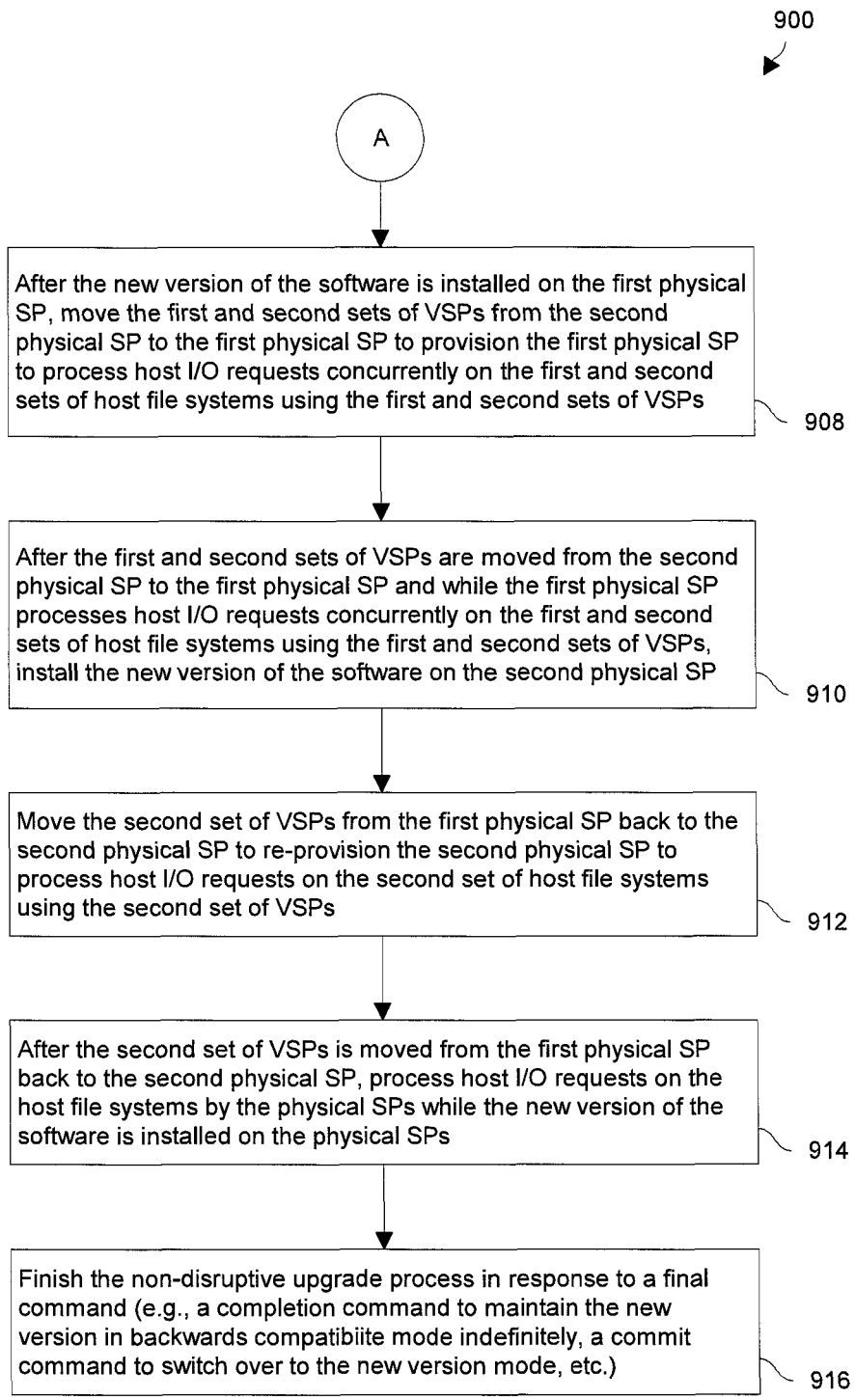

FIGS. 11A and 11B provide a flowchart of a procedure 900 which is performed by the data storage apparatus 116 for NDU. With reference to FIG. 11A, at 902, with (i) a first physical SP 120 initially using a first set of VSPs 150 to define a first set of operating environments for a first set of host file systems, (ii) a second physical SP 120 initially using a second set of VSPs 150 to define a second set of operating environments for a for a second set of host file systems, and (iii) an initial version of the software being installed on each of the first and second physical SPs 120, the physical SPs 120 process host input/output (I/O) requests on the host file systems (also see FIG. 7).

At 904, the first set of VSPs 150 is moved from the first physical SP 120 to the second physical SP 120 to provision the second physical SP 120 to process host I/O requests concurrently on the first and second sets of host file systems using the first and second sets of VSPs 150 (also see FIG. 8). It should be understood that the configuration database 170 is updated to reflect the current locations of the VSPs 150 during NDU. It should be further understood that, if the data storage apparatus 116 concurrently performs block-based processing of host I/O requests, any block-based processing performed by the first physical SP 120 is trespassed over to the second physical SP 120 at this time as well. Accordingly, the first physical SP 120 is now free to receive a software upgrade.

At 906, after the first set of VSPs 150 is moved from the first physical SP 120 to the second physical SP 120 and while the second physical SP 120 processes host I/O requests concurrently on the first and second sets of host file systems using the first and second sets of VSPs 150, a new version 812 of the software is installed on the first physical SP 120 (FIG. 8). As mentioned earlier, the new version 812 of the software is backwards compatible with the initial version of the software.

At 908 (see FIG. 11B), after the new version 812 of the software is installed on the first physical SP 120, the first and second sets of VSPs 150 are moved from the second physical SP 120 to the first physical SP 120 to provision the first physical SP 120 to process host I/O requests concurrently on the first and second sets of host file systems using the first and second sets of VSPs 150 (also see FIG. 9). Any block-based processing performed by the second physical SP 120 is transferred over to the first physical SP 120 at this time as well. Accordingly, the second physical SP 120 is now free to receive a software upgrade.

At 910, after the first and second sets of VSPs 150 are moved from the second physical SP 120 to the first physical SP 120 and while the first physical SP 120 processes host I/O requests concurrently on the first and second sets of host file systems using the first and second sets of VSPs 150, the new version 812 of the software is installed on the second physical SP 120 (FIG. 9).

At 912, the second set of VSPs is moved from the first physical SP 120 back to the second physical SP 120 to re-provision the second physical SP 120 to process host I/O requests on the second set of host file systems using the second set of VSPs 150 (also see FIG. 10). Any block-based processing initially performed by the second physical SP 120 is transferred back over to the second physical SP 120 at this time as well.

At 914, after the second set of VSPs 150 is moved from the first physical SP 120 back to the second physical SP 120, the physical SPs 120 process host I/O requests on the host file systems while the new version 812 of the software is installed on the physical SPs 120 (FIG. 10).

At 916, the data storage apparatus 116 receives a command to finish NDU. In particular, the user may enter a commit command 810 into the user interface 800 which directs the data storage apparatus 116 to switch each of the first and second physical SPs 120 from operating using the new version 812 of the software in the backward compatible mode to operating using the new version 812 of the software in a new version mode which is different than the backward compatible mode. Alternatively, the user may enter a complete command 810 which directs the data storage apparatus 116 to deem the NDU process to be complete while continuing to operate each of the first and second physical SPs 120 using the new version 812 of the software in the backward compatible mode.

As described above, improved techniques are directed to performing NDU of software on a data storage apparatus 116 having multiple physical SPs 120 which access VSPs 150. The VSPs 150 are capable of being moved from one physical SP 120 to another during NDU. Accordingly, a new version 812 of software can be installed on each physical SP 120 while that physical SP 120 is free of VSPs 150, i.e., with the VSPs 150 residing on one or more remaining physical SPs 120 of the data storage apparatus 116. Additionally, the new version 812 of the software is capable of being backwards compatible so that once all of the physical SPs 120 have the new version installed, a coordinated switchover can take place which commits the data storage apparatus 116 to operating in accordance with a new mode that is different from the backwards compatible mode.

While various embodiments of the present disclosure have been particularly shown and described, it will be understood by those skilled in the art that various changes in form and details may be made therein without departing from the spirit and scope of the present disclosure as defined by the appended claims.

For example, it should be understood that the data storage apparatus 116 was described above as having two physical SPs 120 by way of example only. In other arrangements, the data storage apparatus 116 has more than two physical SPs 120 (e.g., three, four, six, eight, and so on). In these arrangements, the processing of host I/O requests is moved from each physical SP 120 and then the software on that physical SP 120 is upgraded. In some arrangements, movement of such processing is performed in a smart load balancing manner for improved quality of service. Accordingly, the data storage apparatus 116 is able to carry out NDU since processing of host I/O requests, including VSP access, which enables processing of file-based I/Os, is now movable among physical SPs 120. That is, since the abstraction provided by VSPs 150 which contain entire file system personalities makes file-based processing movable (and there may be many VSP instances on each physical SP 120), NDU is possible.

Further, although features are shown and described with reference to particular embodiments hereof, such features may be included in any of the disclosed embodiments and their variants. Thus, it is understood that features disclosed in connection with any embodiment can be included as variants of any other embodiment, whether such inclusion is made explicit herein or not. Those skilled in the art will therefore understand that various changes in form and detail may be made to the embodiments disclosed herein without departing from the scope of the disclosure. Such modifications and enhancements are intended to belong to various embodiments of the disclosure.

What is claimed is:

1. A method of performing a non-disruptive upgrade of software installed on physical storage processors of a data storage apparatus, the method comprising:
   with (i) a first physical storage processor initially using a first set of virtual storage processors (VSPs) to define a first set of operating environments for a first set of host file systems, (ii) a second physical storage processor initially using a second set of VSPs to define a second set of operating environments for a second set of host file systems, wherein each one of the host file systems in the first and second sets of host file systems is contained within one of a plurality of lower-deck files of a lower-deck file system of the data storage apparatus, and (iii) an initial version of the software being installed on each of the first and second physical storage processors, processing host input/output (I/O) requests on the host file systems by the physical storage processors;
   moving the first set of VSPs from the first physical storage processor to the second physical storage processor to provision the second physical storage processor to process host I/O requests concurrently on the first and second sets of host file systems using the first and second sets of VSPs;
   after the first set of VSPs is moved from the first physical storage processor to the second physical storage processor and while the second physical storage processor processes host I/O requests concurrently on the first and second sets of host file systems using the first and second sets of VSPs, installing a new version of the software on the first physical storage processor, the new version of the software being backwards compatible with the initial version of the software; and
   converting, by the second physical storage processor, after the first set of VSPs is moved from the first physical storage processor to the second physical storage processor, the host I/O requests on the first and second sets of host file systems into reads and writes to the lower-deck files containing each of the host file systems in the first and second sets of host files systems.

2. A method as in claim 1, further comprising:
   after the new version of the software is installed on the first physical storage processor, moving the first and second sets of VSPs from the second physical storage processor to the first physical storage processor to provision the first physical storage processor to process host I/O requests concurrently on the first and second sets of host file systems using the first and second sets of VSPs; and
   after the first and second sets of VSPs are moved from the second physical storage processor to the first physical storage processor and while the first physical storage processor processes host I/O requests concurrently on the first and second sets of host file systems using the first and second sets of VSPs, installing the new version of the software on the second physical storage processor.

3. A method as in claim 2, further comprising:
   moving the second set of VSPs from the first physical storage processor back to the second physical storage processor to re-provision the second physical storage processor to process host I/O requests on the second set of host file systems using the second set of VSPs; and
   after the second set of VSPs is moved from the first physical storage processor back to the second physical storage processor, processing host I/O requests on the host file systems by the physical storage processors using the new version of the software installed on the physical storage processors.

4. A method as in claim 3 wherein processing host I/O requests on the host file systems by the physical storage processors while the new version of the software is installed on the physical storage processors includes:
   processing host I/O requests on the host file systems by the physical storage processors while each of the first and second physical storage processors operates using the new version of the software in a backward compatible mode.

5. A method as in claim 4, further comprising:
   receiving a commit command, and
   in response to the commit command, switching each of the first and second physical storage processors from operating using the new version of the software in the backward compatible mode to operating using the new version of the software in a new version mode which is different than the backward compatible mode.

6. A method as in claim 5 wherein operating the first and second physical storage processors using the new version of the software in the backward compatible mode includes processing host I/O requests in accordance with a first file-based protocol; and
   wherein operating the first and second physical storage processors using the new version of the software in the new version mode includes processing host I/O requests in accordance with a second file-based protocol that is different than the first file-based protocol.

7. A method as in claim 4, further comprising:
   receiving a completion command, and
   in response to the completion command, deeming the non-disruptive upgrade of the software to be complete while continuing to operate each of the first and second physical storage processors using the new version of the software in the backward compatible mode rather than switch to using the new version of the software in a new version mode which is different than the backward compatible mode.

8. A method as in claim 4 wherein each VSP includes a root file system and a VSP configuration file system contained within a set of lower-deck files of the lower-deck file system of the data storage apparatus, the VSP configuration file system storing VSP data which identifies host file system operating environment characteristics;

wherein using the first set of VSPs to define the first set of operating environments includes accessing the VSP configuration file system of each VSP of the first set; and wherein using the second set of VSPs to define the second set of operating environments includes accessing the VSP configuration file system of each VSP of the second set.

9. A method as in claim 4 wherein the data storage apparatus includes at least two physical storage processors; and wherein the method further comprises:

prior to processing the host I/O requests on the host file systems by the physical storage processors, updating a configuration database to identify, for each VSP, one of the physical storage processors as a primary owner of that VSP, each VSP residing on its primary owner upon completion of the non-disruptive upgrade.

10. A method as in claim 4, further comprising:

trespassing block-based processing among the physical storage processors in tandem with moving VSPs among the physical storage processors to remove processing of all host I/O requests from each physical storage processor when the new version of the software is installed on that physical storage processor.

11. A method as in claim 1, wherein each VSP stores its own network address;

wherein each host I/O request is directed to a network address of a VSP; and wherein moving the first set of VSPs from the first physical storage processor to the second physical storage processor is performed without changing the network address of any VSP in the first set of VSPs.

12. A computer program product having a non-transitory computer readable medium which stores a set of instructions to perform a non-disruptive upgrade of software installed on physical storage processors of a data storage apparatus, the set of instructions, when carried out by processing circuitry, causing the processing circuitry to perform a method of:

with (i) a first physical storage processor initially using a first set of virtual storage processors (VSPs) to define a first set of operating environments for a first set of host file systems, (ii) a second physical storage processor initially using a second set of VSPs to define a second set of operating environments for a second set of host file systems, wherein each one of the host file systems in the first and second sets of host file systems is contained within one of a plurality of lower-deck files of a lower-deck file system of the data storage apparatus, and (iii) an initial version of the software being installed on each of the first and second physical storage processors, processing host input/output (I/O) requests on the host file systems by the physical storage processors;

moving the first set of VSPs from the first physical storage processor to the second physical storage processor to provision the second physical storage processor to process host I/O requests concurrently on the first and second sets of host file systems using the first and second sets of VSPs;

after the first set of VSPs is moved from the first physical storage processor to the second physical storage processor and while the second physical storage processor processes host I/O requests concurrently on the first and second sets of host file systems using the first and second sets of VSPs, installing a new version of the software on the first physical storage processor, the new version of the software being backwards compatible with the initial version of the software; and converting, by the second physical storage processor, after the first set of VSPs is moved from the first physical storage processor to the second physical storage processor, the host I/O requests on the first and second sets of host file systems into reads and writes to the lower-deck files containing each of the host file systems in the first and second sets of host files systems.

13. A computer program product as in claim 12 wherein the method further comprises:

after the new version of the software is installed on the first physical storage processor, moving the first and second sets of VSPs from the second physical storage processor to the first physical storage processor to provision the first physical storage processor to process host I/O requests concurrently on the first and second sets of host file systems using the first and second sets of VSPs; and after the first and second sets of VSPs are moved from the second physical storage processor to the first physical storage processor and while the first physical storage processor processes host I/O requests concurrently on the first and second sets of host file systems using the first and second sets of VSPs, installing the new version of the software on the second physical storage processor.

14. A computer program product as in claim 13 wherein the method further comprises:

moving the second set of VSPs from the first physical storage processor back to the second physical storage processor to re-provision the second physical storage processor to process host I/O requests on the second set of host file systems using the second set of VSPs; and after the second set of VSPs is moved from the first physical storage processor back to the second physical storage processor, processing host I/O requests on the host file systems by the physical storage processors using the new version of the software installed on the physical storage processors.

15. A computer program product as in claim 14 wherein processing host I/O requests on the host file systems by the physical storage processors while the new version of the software is installed on the physical storage processors includes:

processing host I/O requests on the host file systems by the physical storage processors while each of the first and second physical storage processors operates using the new version of the software in a backward compatible mode.

16. A computer program product as in claim 15 wherein the method further comprises:

trespassing block-based processing among the physical storage processors in tandem with moving VSPs among the physical storage processors to remove processing of all host I/O requests from each physical storage processor when the new version of the software is installed on that physical storage processor.

17. A method as in claim 8 wherein each VSP includes a namespace independent of the namespace of any other VSP; and wherein the root file system and VSP configuration file system of each VSP are both contained within the namespace of the VSP.

18. An electronic apparatus, comprising:

memory; and control circuitry coupled to the memory, the memory storing instructions which, when carried out by the control circuitry, cause the control circuitry to perform a non-disruptive upgrade of software installed on physical storage processors by:

with (i) a first physical storage processor initially using a first set of virtual storage processors (VSPs) to define a first set of operating environments for a first set of host file systems, (ii) a second physical storage processor initially using a second set of VSPs to define a second set of operating environments for a second set of host file systems, wherein each one of the host file systems in the first and second sets of host file systems is contained within one of a plurality of lower-deck files of a lower-deck file system of the data storage apparatus, and (iii) an initial version of the software being installed on each of the first and second physical storage processors, processing host input/output (I/O) requests on the host file systems by the physical storage processors, moving the first set of VSPs from the first physical storage processor to the second physical storage processor to provision the second physical storage processor to process host I/O requests concurrently on the first and second sets of host file systems using the first and second sets of VSPs, after the first set of VSPs is moved from the first physical storage processor to the second physical storage processor and while the second physical storage processor processes host I/O requests concurrently on the first and second sets of host file systems using the first and second sets of VSPs, installing a new version of the software on the first physical storage processor, the new version of the software being backwards compatible with the initial version of the software, and converting, by the second physical storage processor, after the first set of VSPs is moved from the first physical storage processor to the second physical storage processor, the host I/O requests on the first and second sets of host file systems into reads and writes to the lower-deck files containing each of the host file systems in the first and second sets of host files systems.

19. An electronic apparatus as in claim 18 wherein the instructions further cause the control circuitry to:

after the new version of the software is installed on the first physical storage processor, move the first and second sets of VSPs from the second physical storage processor to the first physical storage processor to provision the first physical storage processor to process host I/O requests concurrently on the first and second sets of host file systems using the first and second sets of VSPs; and after the first and second sets of VSPs are moved from the second physical storage processor to the first physical storage processor and while the first physical storage processor processes host I/O requests concurrently on the first and second sets of host file systems using the first and second sets of VSPs, install the new version of the software on the second physical storage processor.

20. An electronic apparatus as in claim 19 wherein the instructions further cause the control circuitry to:

move the second set of VSPs from the first physical storage processor back to the second physical storage processor to re-provision the second physical storage processor to process host I/O requests on the second set of host file systems using the second set of VSPs; and after the second set of VSPs is moved from the first physical storage processor back to the second physical storage processor, process host I/O requests on the host file systems by the physical storage processors using the new version of the software installed on the physical storage processors.

21. An electronic apparatus as in claim 20 wherein processing host I/O requests on the host file systems by the physical storage processors while the new version of the software is installed on the physical storage processors includes:

processing host I/O requests on the host file systems by the physical storage processors while each of the first and second physical storage processors operates using the new version of the software in a backward compatible mode.

22. An electronic apparatus as in claim 21, further comprising:

a configuration database coupled to the control circuitry; and wherein the instructions further cause the control circuitry to:

prior to processing the host I/O requests on the host file systems by the physical storage processors, update the configuration database to identify, for each VSP, one of the physical storage processors as a primary owner of that VSP, each VSP residing on its primary owner upon completion of the non-disruptive upgrade.

* * * * *